(12) United States Patent
Lin et al.

(10) Patent No.: US 9,299,004 B2
(45) Date of Patent: Mar. 29, 2016

(54) IMAGE FOREGROUND DETECTION

(71) Applicant: Adobe Systems Incorporated, San Jose, CA (US)

(72) Inventors: Zhe Lin, Fremont, CA (US); Radomir Mech, Mountain View, CA (US); Peng Wang, Los Angeles, CA (US)

(73) Assignee: Adobe Systems Incorporated, San Jose, CA (US)

( * ) Notice: Subject to any disclaimer, the term of this patent is extended or adjusted under 35 U.S.C. 154(b) by 224 days.

(21) Appl. No.: 14/062,680

(22) Filed: Oct. 24, 2013

(65) Prior Publication Data

US 2015/0117784 A1    Apr. 30, 2015

(51) Int. Cl.
*G06K 9/46* (2006.01)
*G06K 9/66* (2006.01)
*G06T 7/00* (2006.01)

(52) U.S. Cl.
CPC ............ *G06K 9/4671* (2013.01); *G06T 7/0081* (2013.01); *G06T 7/0093* (2013.01); *G06T 2207/20004* (2013.01); *G06T 2207/20016* (2013.01); *G06T 2207/20076* (2013.01); *G06T 2207/20081* (2013.01); *G06T 2207/20144* (2013.01); *G06T 2207/20148* (2013.01)

(58) Field of Classification Search
CPC .. G06K 9/4671; G06T 7/0081; G06T 7/0093; G06T 2207/20004; G06T 2207/20016; G06T 2207/20076; G06T 2207/20081; G06T 2207/20144; G06T 2207/20148
See application file for complete search history.

(56) References Cited

U.S. PATENT DOCUMENTS

| | | | |
|---|---|---|---|
| 8,345,986 B2 | 1/2013 | Nakagomi | |
| 8,660,351 B2 | 2/2014 | Tang | |
| 8,687,887 B2 | 4/2014 | Norimatsu et al. | |
| 2002/0191860 A1 | 12/2002 | Cheatle | |
| 2006/0256134 A1 | 11/2006 | Widdowson | |
| 2009/0278958 A1 | 11/2009 | Bregman-Amitai et al. | |
| 2010/0092085 A1 | 4/2010 | Marchesotti | |
| 2012/0106834 A1* | 5/2012 | Lin ................... | G08B 13/19604 382/155 |
| 2012/0268612 A1* | 10/2012 | Wang ................. | G06K 9/00624 348/207.1 |
| 2012/0294514 A1 | 11/2012 | Saunders et al. | |
| 2013/0039579 A1 | 2/2013 | Ahn et al. | |
| 2013/0084013 A1* | 4/2013 | Tang ................... | G06K 9/4671 382/195 |

(Continued)

OTHER PUBLICATIONS

Hou et al., "Saliency detection: A spectral residual approach", 2007, (IEEE Conference on Computer Vision and Pattern Recognition, pp. 1-8.*

(Continued)

*Primary Examiner* — Gregory M Desire
(74) *Attorney, Agent, or Firm* — Wolfe-SBMC

(57) ABSTRACT

In techniques for image foreground detection, a foreground detection module is implemented to generate varying levels of saliency thresholds from a saliency map of an image that includes foreground regions. The saliency thresholds can be generated based on an adaptive thresholding technique applied to the saliency map of the image and/or based on multi-level segmentation of the saliency map. The foreground detection module applies one or more constraints that distinguish the foreground regions in the image, and detects the foreground regions of the image based on the saliency thresholds and the constraints. Additionally, different ones of the constraints can be applied to detect different ones of the foreground regions, as well as to detect multi-level foreground regions based on the saliency thresholds and the constraints.

20 Claims, 14 Drawing Sheets

(56) References Cited

U.S. PATENT DOCUMENTS

| | | | |
|---|---|---|---|
| 2013/0223740 A1* | 8/2013 | Wang | G06T 7/0083 382/171 |
| 2013/0272611 A1 | 10/2013 | Nakamura et al. | |
| 2014/0003711 A1* | 1/2014 | Ngan | G06T 7/0081 382/164 |
| 2014/0334681 A1 | 11/2014 | Kinoshita | |
| 2015/0086077 A1 | 3/2015 | Du et al. | |
| 2015/0116350 A1 | 4/2015 | Lin et al. | |
| 2015/0117777 A1* | 4/2015 | Hsun | G06T 7/0051 382/173 |
| 2015/0117783 A1* | 4/2015 | Lin | G06K 9/4671 382/195 |
| 2015/0117784 A1* | 4/2015 | Lin | G06K 9/4671 382/195 |
| 2015/0169989 A1* | 6/2015 | Bertelli | G06K 9/6202 382/165 |

OTHER PUBLICATIONS

Achanta et al., "Frequency-tuned salient region detection", 2009, (IEEE Conference on Computer Vision and Pattern Recognition, pp. 1597-1604.*

Q. Huang, et al., "Foreground/background segmentation of color images by integration of multiple cues", 1995, in Proc. IEEE Int. Conf. Image Process., pp. 246-249.*

"Pre-Interview Communication", U.S. Appl. No. 14/062,751, Jul. 1, 2015, 25 pages.

Cheng, Ming-Ming et al., "Global contrast based salient region detection", *In CVPR*, pp. 409-416, 2011., (2011), 8 pages.

Felzenszwalb, et al., "Efficient Graph-Based Image Segmentation", *International Journal of Computer Vision* 59(2), (Sep. 17, 2003),16 pages.

Harel, Jonathan et al., "Graph-based visual saliency", *In NIPS*, 2006. [4] H. Jiang, J. Wang,, (2006), 8 pages.

Jiang, Huaizu et al., "Automatic salient object segmentation based on context and shape prior", *In BMVC*, pp. 1-12, 2011.,(2011),12 pages.

Lowe, David G., "Distinctive Image Features from Scale-Invariant Keypoints", *International Journal of Computer Vision*, Available at <http://www.cs.ubc.ca/~lowe/papers/ijc04.pdf>, (Jan. 5, 2004), pp. 1-28.

Park, Jaesik et al., "Modeling photo composition and its application to photo re-arrangement", *In ICIP*, pp. 2741-2744, 2012., (2012), 4 pages.

Yan, Jianzhou et al., "Learning the Change for Automatic Image Cropping", *In CVPR*, 2013., (2013), pp. 971-978.

"Pre-Interview Communication", U.S. Appl. No. 14/062,559, Sep. 24, 2015, 3 pages.

"First Action Interview Office Action", U.S. Appl. No. 14/062,751, Oct. 26, 2015, 3 pages.

"Notice of Allowance", U.S. Appl. No. 14/062,559, Dec. 30, 2015, 8 pages.

* cited by examiner

IMAGE FOREGROUND DETECTION

BACKGROUND

Many types of devices today include a digital camera that can be used to capture digital photos, such as with a mobile phone, tablet device, a digital camera device, and other electronic media devices. The accessibility and ease of use of the many types of devices that include a digital camera makes it quite easy for most anyone to take photos. Many users also want to enhance their photos, such as by cropping them to improve the visual composition and quality of the photos, or for a different aspect ratio (landscape, panoramic, etc.). A digital image, such as a photo, can be cropped to improve the composition by removing unnecessary or distracting objects from the image, while also shifting the subject focus of the image. Although there are general rules for image composition defined by expert photographers, such as the rule-of-thirds for image cropping, the composition styles and preferences can vary from one user to the next.

Due to the many varying composition styles and preferences, conventional cropping techniques include manually designing cropping rules which can involve tedious parameter adjustments for cropping with the user-designed rules. The limitations of other techniques result in limited features of an image being determined, such as with saliency estimation techniques used to determine the most prominent or noticeable objects or regions of an image. Conventional techniques to compute a saliency map for an image only take into account an overall global saliency to detect a single salient region of an image as salient object detection, which is limited in handling complex scenes of an image with multiple objects. Further, the conventional techniques used to detect foreground objects from a saliency map typically detect only a single foreground object using graph cuts or align with image-based segmentation. A saliency technique that only identifies the main subject or principal region in an image scene can help to remove unnecessary content from an image when cropped, but does not take into account the overall composition of the image, and the cropped image may result in a poor visual image.

SUMMARY

This Summary introduces features and concepts of image foreground detection, which is further described below in the Detailed Description and/or shown in the Figures. This Summary should not be considered to describe essential features of the claimed subject matter, nor used to determine or limit the scope of the claimed subject matter.

Image foreground detection is described. In embodiments, a foreground detection module of a composition application is implemented to generate varying levels of saliency thresholds from a saliency map of an image that includes foreground regions. The saliency thresholds can be generated based on an adaptive thresholding technique applied to the saliency map of the image and/or based on multi-level segmentation of the saliency map. The foreground detection module applies one or more constraints that distinguish the foreground regions in the image, and detects the foreground regions of the image based on the saliency thresholds and the constraints. Additionally, different ones of the constraints can be applied to detect different ones of the foreground regions, as well as to detect multi-level foreground regions based on the saliency thresholds and the constraints.

BRIEF DESCRIPTION OF THE DRAWINGS

Embodiments of image foreground detection are described with reference to the following Figures. The same numbers may be used throughout to reference like features and components that are shown in the Figures.

DETAILED DESCRIPTION

Figure 1:
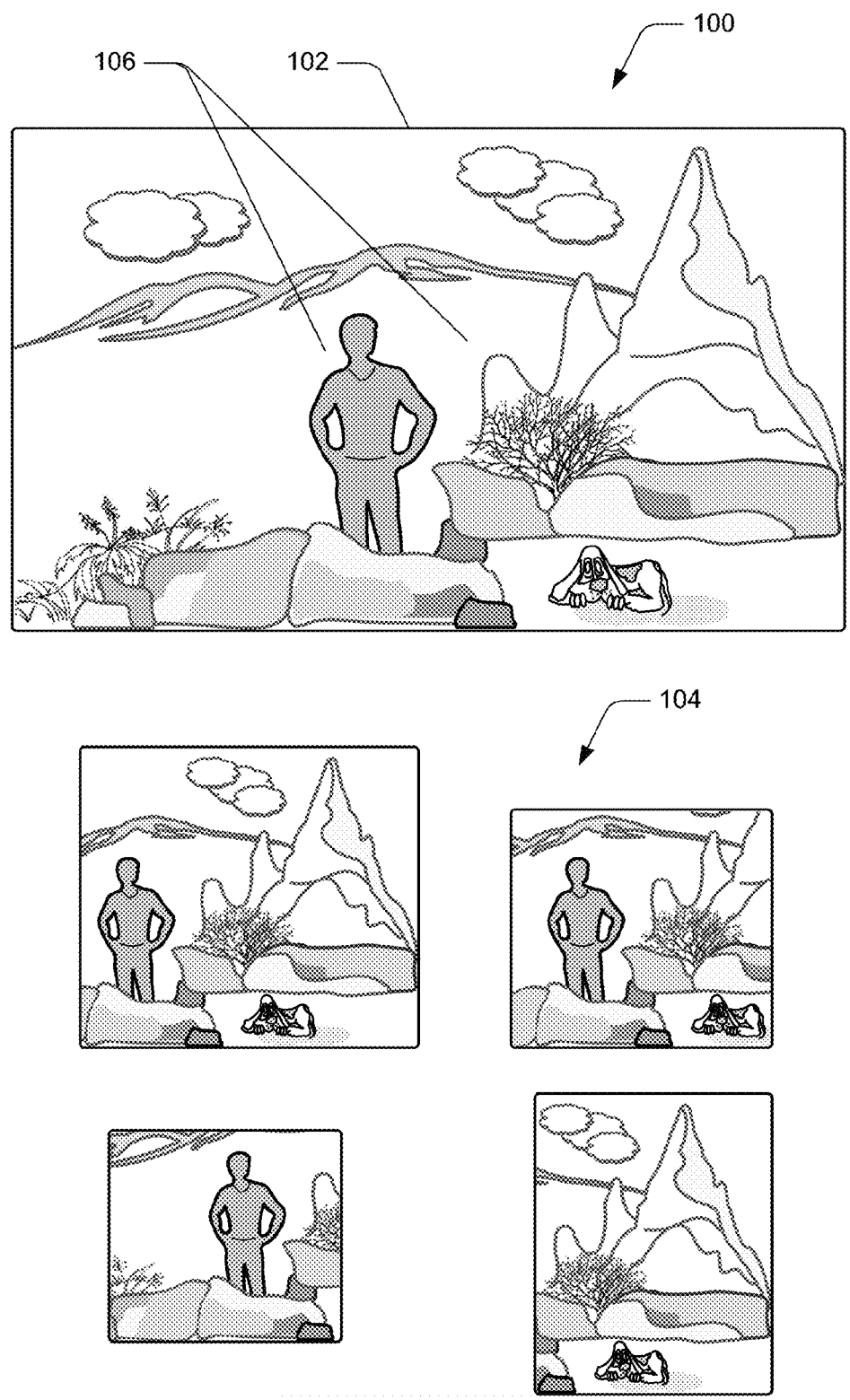
FIG. 1 illustrates an example image and examples of cropped images that are generated from the image in accordance with embodiments of image foreground detection.

Embodiments of image foreground detection are described, along with the features and aspects of iterative saliency map estimation and combined composition and change-based models for image cropping. Digital images, such as photographs, vary in shape, size (e.g., aspect ratio), lighting, and appearance, and image composition styles and preferences can vary with users. Composition rules and criteria are not fixed, and labeled results of image cropping are not easily measured. A learning-based approach for automatic image cropping is described, and a learned composition model is developed utilizing a first database that includes a large set of well-composed images (e.g., professional photographer images) and a second database containing images before and after cropping by expert photographers.

A saliency map represents the visual saliency of an image scene, and the most prominent, relevant, and/or noticeable regions of the image are the salient image regions that are determined based on various contributing components. Iterative saliency map estimation implements an iterative algorithm for robust saliency map estimation by examining local saliency and combining saliency cues at low-levels and high-levels, yielding robust image attention features. Combining saliency and image segmentation, image foreground detection implements a multi-level foreground segmentation algorithm for detecting multiple salient object candidates. Using the iterative saliency map estimation and multi-level foreground segmentation, a Gaussian mixture model (GMM) and a regression function are developed for evaluating the composition of a cropped photograph and the validity of the change from the original photograph, respectively. The learned composition model robustly determines composition rules and changes, and can determine the variations in real-world images, as well as develop and learn from personal user composition styles of image cropping.

A composition application that implements the learned composition model can be implemented to provide professional cropping advice to novice photographers, help photographers and image editors improve cropping selections, used as an automatic imaging recommendation, to generate thumbnail images, for image retargeting to display the image on a different device or rotated with a different aspect ratio, and/or for in-camera automation for optimizing photo composition. In implementations, embodiments of image foreground detection are applicable for any type of application user interface that may be displayed for user interaction as related to image composition and editing, such as for photograph composition, illustration editing, graphic design, and other types of image composition applications.

While features and concepts of image foreground detection can be implemented in any number of different devices, systems, networks, environments, and/or configurations, embodiments of image foreground detection are described in the context of the following example devices, systems, and methods.

FIG. 1 illustrates an example 100 of an image 102, such as any type of a digital image, that may be displayed on a display device of a computing system or device. The image 102 can be displayed on any type of display device that is connected to, or integrated with, a computing device, such as any type of computer, mobile phone, tablet device, digital camera, or any other electronic media device that implements a composition application (e.g., a software application) in embodiments of image foreground detection. A computing device can be implemented with various components, such as a processing system and memory, and with any number and combination of differing components as further described with reference to the example device shown in FIG. 14.

For example, a photographer may use a digital camera to capture the image 102, which is displayed in a viewfinder or on an integrated display device of the camera, both before and after the image has been captured. Similarly, a user with a mobile phone or tablet device may use a digital camera that is integrated with the mobile device to capture the image 102, which is displayed on an integrated display device of the mobile phone or tablet device. Alternatively or in addition, a user of a desktop computer or similar system may utilize image composition and editing applications, such as for photograph composition, illustration editing, and graphic design, and the image 102 is displayed on an integrated or connected display device.

A photographer, or generally a user of a camera and/or a mobile device, may want to edit or enhance a photo, such as the image 102, by cropping the image to improve the composition of the photo and/or to remove unwanted features from the photo. For example, cropped images 104 of the image 102 include different features, objects, and regions of the image 102. In the examples described herein, the image 102 includes image regions 106, which include any feature, object, item, area, background, foreground, etc., or any combination thereof that may be displayed or represented in an image. As further described, an image region may also include a salient representation of an image feature, and a foreground is an image region that can be determined based on threshold levels of saliency values for the segmentation region and/or based on saliency contrast within a context of the entire image.

Figure 2:
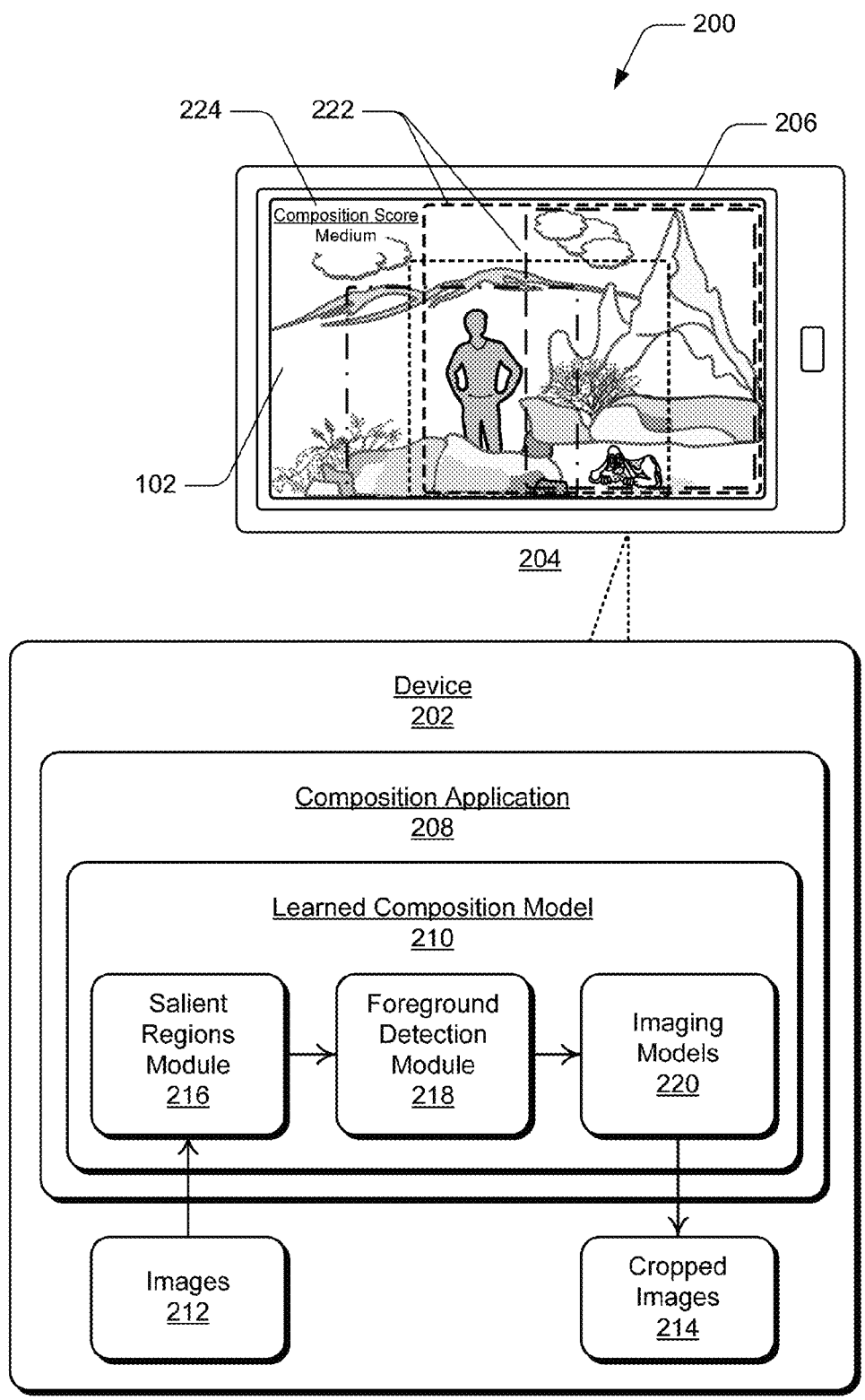
FIG. 2 illustrates an example system in which embodiments of image foreground detection can be implemented.

FIG. 2 illustrates an example system 200 in which embodiments of image foreground detection can be implemented. The example system 200 includes a device 202 that may be any type of computing and/or electronic device, such as a digital camera or a mobile phone 204 integrated with a digital camera device. In this example, the mobile phone 204 (representative of the device 202) includes an integrated display device 206 on which the image 102 is displayed. The device 202 can be implemented with various components, such as a processing system and memory, and with any number and combination of differing components as further described with reference to the example device shown in FIG. 14.

The device 202 can include implementations of a composition application 208, which can be implemented as a software application, such as executable software instructions (e.g., computer-executable instructions) that are executable by a processing system of the device and stored on a computer-readable storage memory of the device. The composition application 208 includes a learned composition model 210 that can be applied to images 212 and generate cropped images 214 of the respective images. The image 102 shown in FIG. 1 and displayed on the display device 206 of the mobile phone 204 is an example of the images 212.

The learned composition model 210 includes various modules and models to implement techniques and features of image composition and cropping. For example, the learned composition model 210 includes a salient regions module 216 to implement iterative saliency map estimation, and a foreground detection module 218 to implement image foreground detection. The learned composition model 210 also includes imaging models 220, that together with the salient regions module 216 and the foreground detection module 218, implement combined composition and change-based models for image cropping. The salient regions module 216 and features of iterative saliency map estimation are further described with reference to FIGS. 4-6. The foreground detection module 218 and features of image foreground detection are further described with reference to FIGS. 7-8. The learned composition model 210, as well as the imaging models 220 and features of combined composition and change-based models for image cropping, are further described with reference to FIGS. 9-13.

As described above, the image 102 can be displayed on the integrated display device 206 of the mobile phone 204, or on a viewfinder or display of a digital camera, both before and after the image has been captured. In embodiments, the composition application 208 is implemented to initiate a display of visual cues 222 as cropped image representations for user-assisted image cropping of the displayed image. In this example, the visual cues 222 indicate the cropped images 104 of the image 102 that are shown and described with reference to FIG. 1. Alternatively or in addition, a composition score 224 can be displayed to assist a user decision or selection of a cropped image, such as when a user selects one of the visual cues 222 for a cropped image, or initiates his or her own cropped image.

The visual cues 222 and/or the composition score 224 can be utilized to provide professional cropping advice to novice photographers, help photographers and image editors improve cropping selections, used as an automatic imaging recommendation, to generate thumbnail images, for image retargeting to display the image on a different device or rotated with a different aspect ratio, and/or for in-camera automation for optimizing photo composition. The composition application 208 is implemented to process an image 212, such as the image 102, in real-time and can provide the visual cues 222 and/or the composition score 224 to help the user improve the composition of the image. The composition application may also generate other visual indicators, such as arrows left, right, up, and down to indicate camera lens direction adjustment as the image is captured. The composition application may also initiate displaying an indication to the user to expand left, right, up, and/or down to capture additional image data of the image for later cropping and other editing.

Example methods 300, 600, 800, and 1100 are described herein with reference to respective FIGS. 3, 6, 8, and 11. Features of a composition application for user-assisted image cropping are described with reference to the method shown in FIG. 3, features of iterative saliency map estimation are described with reference to the method shown in FIG. 6, features of image foreground detection are described with reference to the method shown in FIG. 8, and features of the combined composition and change-based models for image cropping are described with reference to the method shown in FIG. 11. Generally, any of the services, components, modules, methods, and operations described herein can be implemented using software, firmware, hardware (e.g., fixed logic circuitry), manual processing, or any combination thereof. The example methods may be described in the general context of executable instructions stored on a computer-readable storage memory that is local and/or remote to a computer processing system, and implementations can include software applications, programs, functions, and the like.

Figure 3:
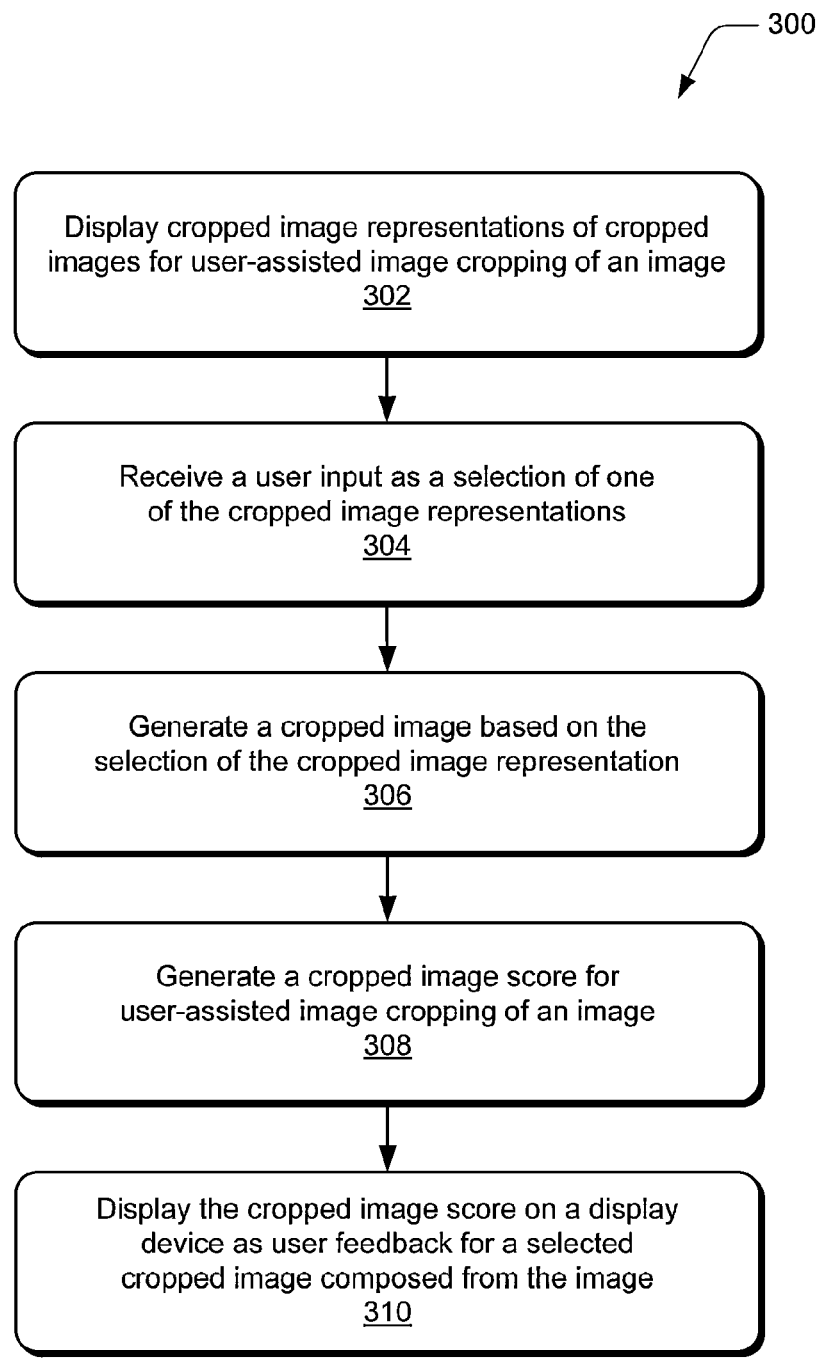
FIG. 3 illustrates example method(s) of a composition application for image cropping in accordance with one or more embodiments.

FIG. 3 illustrates example method(s) 300 of a composition application, and is generally described with reference to a learned composition model of the composition application implemented by a computing device. The order in which the method is described is not intended to be construed as a limitation, and any number or combination of the method operations can be combined in any order to implement a method, or an alternate method.

At 302, cropped image representations of a cropped image are displayed for user-assisted image cropping of an image. For example, the composition application 208 initiates a display of the visual cues 222 as cropped image representations for user-assisted image cropping of the displayed image 102, and as shown in FIG. 2, the visual cues 222 indicate the cropped images 104 of the image 102 that are shown and described with reference to FIG. 1.

At 304, a user input is received as a selection of one of the cropped image representations and, at 306, a cropped image is generated based on the selection of the cropped image representation. For example, the composition application 208 receives a user input as a selection of one of the visual cues 222 (e.g., cropped image representations), and generates the cropped image 104 based on the user selection.

At 308, a composition score is generated for user-assisted image cropping of an image and, at 310, the composition score is displayed on a display device as user feedback for a selected cropped image composed from the image. For example, the composition application 208 initiates a display of the composition score 224 to assist a user decision or selection of a cropped image, such as when a user selects one of the visual cues 222 for a cropped image, or initiates his or her own cropped image.

Figure 4:
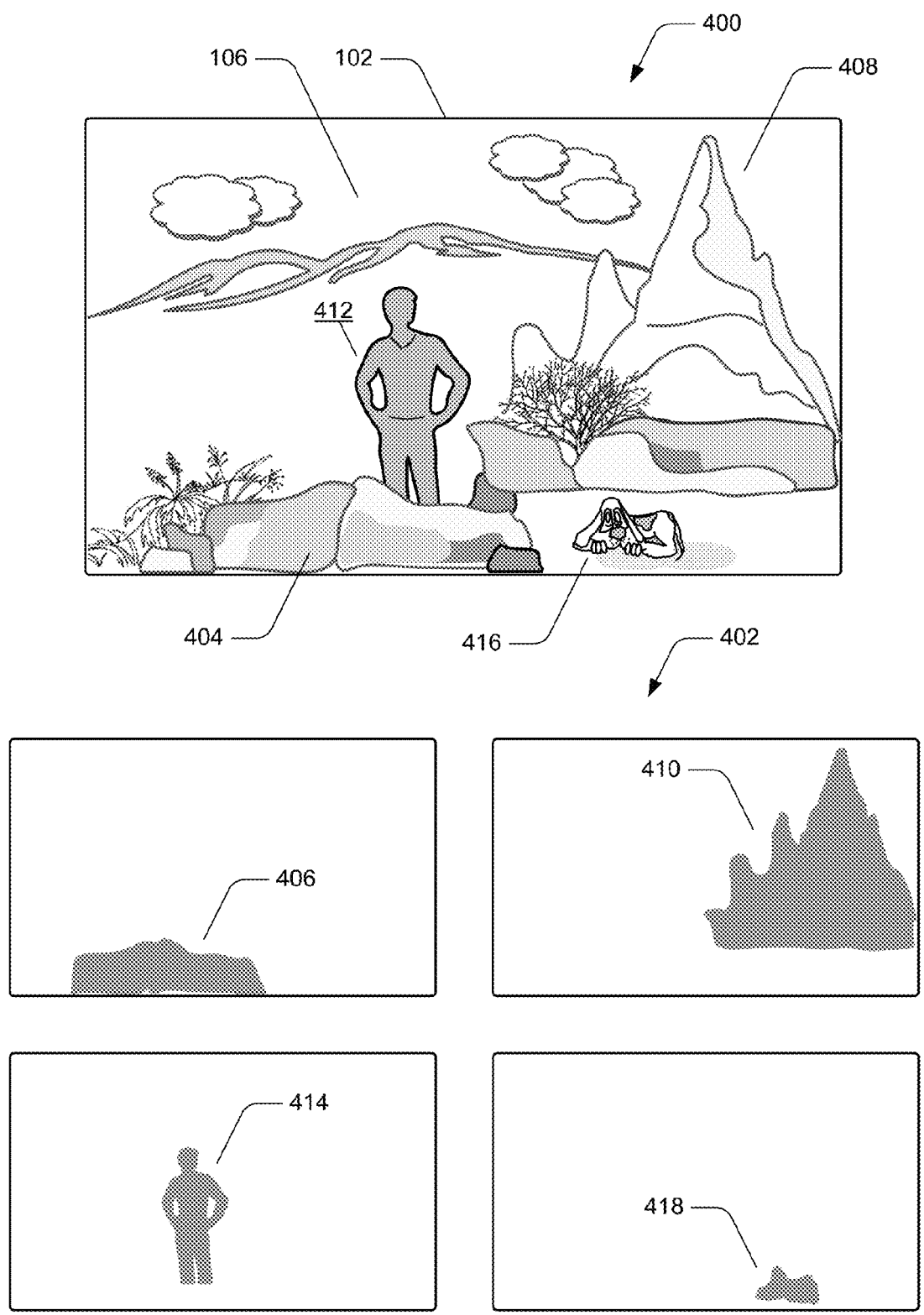
FIG. 4 illustrates an example of iterative saliency map estimation of a single image in accordance with embodiments.

FIG. 4 illustrates an example 400 of iterative saliency map estimation from the image 102. In embodiments, the salient regions module 216 of the composition application 208 shown in FIG. 2 is implemented to apply a saliency estimation technique to compute a global saliency map of the image 102 that includes the image regions 106. A saliency map represents the visual saliency of the image scene, and the most prominent, relevant, and/or noticeable regions of the image are the salient image regions that are determined based on various contributing components, such as motion, intensity, orientation, color, region boundaries, etc. The saliency value of some low contrast object regions of an image may be suppressed by high contrast regions of the image. The salient image regions 402 of the image are determined from the saliency map, such as based on an image segmentation technique or based on contrast thresholds of the image regions.

In an implementation, a saliency map for the image 102 can be computed by segmenting the image into several segment regions $\{r_i\}_{i=1}^{i=N_R}$ by graph-based image segmentation, and the saliency map is iteratively computed to update the saliency map for each iteration of determining a salient image region 402 of the image. For each iteration, the saliency map can be computed by combining multiple regional contrast cues and normalizing the saliency map. Typically, a saliency map and the salient image regions 402 would be displayed as a black background with the salient image regions displayed as white or grey regions on the black background. However, merely for illustrative purposes in this example 400, the salient image regions 402 are shown in a grey scale on a white background.

The salient regions module 216 is implemented to determine a salient image region 402 of the image 102 from the saliency map, and an image region 106 that corresponds to the salient image region is removed from the image. For example, the salient regions module 216 may determine that the image region 404 of the foreground rocks in the image 102 is the most salient image region 406 (e.g., the most prominent, relevant, and/or noticeable region of the image). The image region 404 of the foreground rocks that corresponds to the most salient image region 406 is then removed from the image.

The salient regions module 216 then iteratively determines subsequent salient image regions 402 of the image 102 utilizing the saliency estimation technique to recompute the saliency map of the image with the image region 404 removed. Alternatively as an algorithm variation, the most salient image regions can be iteratively removed and, after each iteration, instead of starting over to recompute saliency in the remaining map using the full algorithm, the salient regions module 216 can simply renormalize the saliency map that was computed at the beginning. Accordingly, the saliency is computed only at the very beginning and then reused for every subsequent iteration.

For each iteration, the image region of the image 102 that corresponds to a subsequent salient image region is removed from the image, and the salient image regions 402 of the image are iteratively determined until no additional salient image regions are detected in the image. For example, the salient regions module 216 may determine that the image region 408 of the rock peak in the image 102 is the next most salient image region 410, and the image region 408 of the rock peak that corresponds to the subsequent salient image region 410 is removed from the image. Similarly, the salient regions module 216 may then determine that the image region 412 of the person is the iterative next most salient image region 414, and the image region 416 of the dog is the iterative next most salient image region 418 of the image 102.

The saliency map S can be computed for each iteration based on a regional contrast saliency map and on a contrast based saliency map, and the formulation for calculating the saliency of an image region is as follows:

$$S(r_k) = -w_b(r_k)w_c(r_k)\log\left(1 - \sum_{r_i \neq r_k} w_s(r_i, r_k)w_a(r_i)d_c(r_i, r_k)\right)$$

where $w_b(r_i)=\exp(-Bd(r_i)/\delta_b^2)$ measures the region connection to the boundary and $Bd(r_i)$ is the portion of the region contour connecting to image boundary $\delta_b=0.2$. Additionally, $w_c(r_i)=\exp(-c(dx_i^2/w^2/w^2+dy_i^2/h^2))$ is a center prior for each region and $dx_i$ and $dy_i$ is the Euclidean distance from the region center to the image center. The $w_a(r_i,r_k)$ is the ratio of the area $r_i$ to the total image area, and $d_c(r_i,r_k)$ is a measure of the color distance of two regions. Then $$w_s(r_i, r_k) = \begin{cases} \exp(-d_s(r_k, r_i)/\delta^2) & \text{if } adj(r_k, r_i) = 0 \\ 1 & \text{otherwise} \end{cases}$$

where $d_s(r_k,r_i)$ is the spacial distance between the center of two regions, and $adj(r_k,r_i)$ is an indicator function by which to judge whether the two regions are adjacent or not. The output map $S_n$ in the current iteration is then normalized in the range of [0,1].

The saliency map can be computed based on multiple resolutions of segmentation and the saliency map is accumulated by averaging to capture the proper context of the objects in the image. In this formulation, the local contrast between a region and its neighborhood is enhanced by an adjacent matrix, and the global contrast is obtained through computation with all of the other regions and accumulated through a spatial decline function. To determine whether salient image regions continue to exist in the image after each iteration, threshold functions can be implemented, such as whether the maximum value of the saliency value S is lower than a threshold $Th_s$, and whether the entropy of a grid histogram computed from the saliency map is larger than a threshold $Th_e$. In implementations, the threshold $Th_s$ can be set to 0.05 and the threshold $Th_e$ can be set to 0.7. The grid histogram is computed by separating the saliency map into a regular grid of b1×b2 and the bins are set to 16×16. The final saliency map is then a linear combination of an iterative saliency map, a graph based visual saliency (GBVS), and taking into account a person in an image detected with a face detection technique.

The salient regions module 216 of the composition application 208 can determine multiple image objects (e.g., as the image regions) displayed in a complex image scene of an image, where each of the determined salient image regions 402 represent one of the image objects in the image. The iterative saliency map estimation leverages local saliency determination of the individual salient image regions based on the global saliency map that is computed for each iteration, and allows separating saliency maps into multiple salient region layers. This provides for the extraction of salient objects having a low contrast in the image, the detection of multiple isolated salient regions, and can divide the salient regions into layers.

Figure 5:
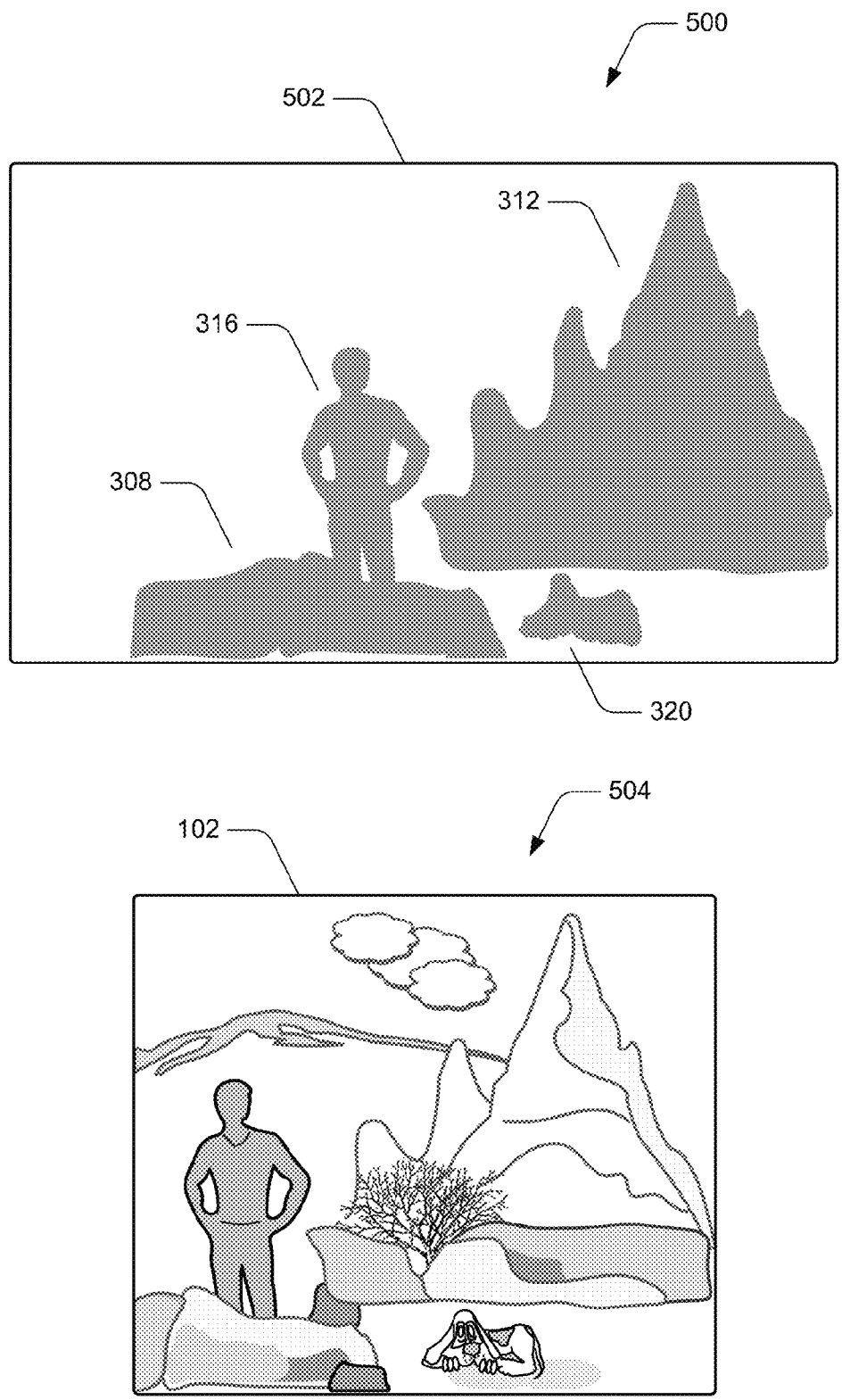
FIG. 5 illustrates an example of a salient features map generated from determined salient image regions based on the iterative saliency map estimation in accordance with embodiments.

FIG. 5 illustrates an example 500 of a salient features map 502 that can be generated to include each of the determined salient image regions 402 of the image 102, and the salient image regions are combined to generate the final saliency map. The salient image regions 402 are iteratively determined by the salient regions module 216 of the composition application 208 as described with reference to FIG. 2. In implementations, the saliency region that is iteratively determined from each iteration can be combined by weighting each of the saliency maps identified from each iteration and combining the weighted maps together (as a union) to generate the final saliency map. For example, the weights can be determined empirically such that the weight is higher for saliency maps obtained in earlier iterations for more importance, or the weight can be determined by some other measure (e.g., based on contrast, uniqueness, distribution, or a combination thereof). As noted above, the salient features map would typically be displayed with a black background and the salient image regions displayed as white or grey regions on the black background. However, merely for illustrative purposes in this example, the salient image regions are shown in a grey scale on a white background.

As shown at 504, the image 102 can also be cropped based on a composition of the salient image regions in the salient features map 502. In an alternate implementation, the salient value for each salient image region 402 can be determined over a range of values in saliency map estimation to normalize the salient image regions. This technique may be useful to search for an image object (as represented by a salient image region) in other images, such as for image comparisons, when a salient image region is estimated with a higher weight value. Additionally, the salient values of the salient image regions 402 are maintained to map any one of the image regions back to the original image 102.

Figure 6:
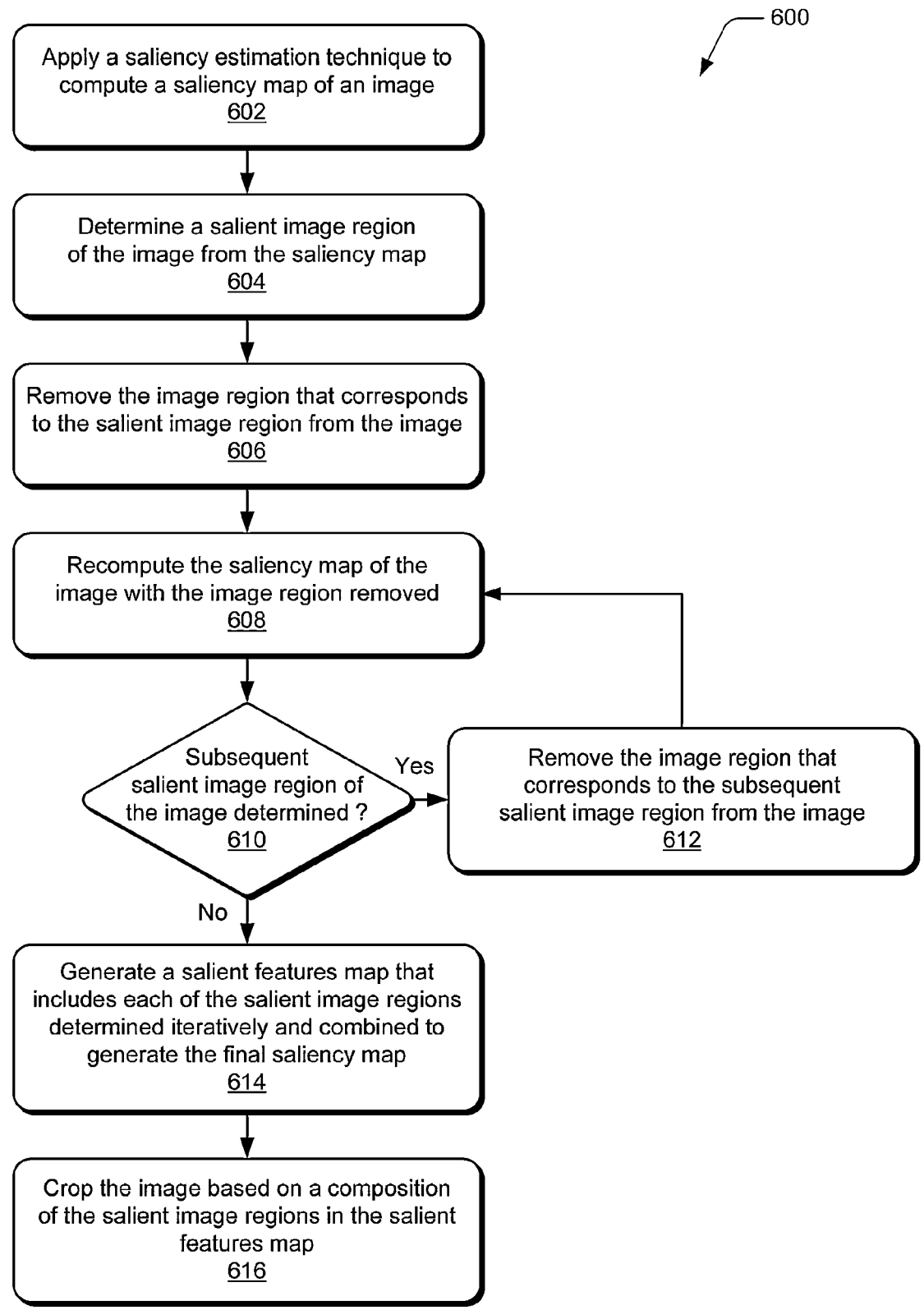
FIG. 6 illustrates example method(s) of iterative saliency map estimation in accordance with one or more embodiments.

FIG. 6 illustrates example method(s) 600 of iterative saliency map estimation, and is generally described with reference to a salient regions module of a composition application implemented by a computing device. The order in which the method is described is not intended to be construed as a limitation, and any number or combination of the method operations can be combined in any order to implement a method, or an alternate method.

At 602, a saliency estimation technique is applied to compute a saliency map of an image. For example, the salient regions module 216 of the composition application 208 (FIG. 2) implemented by the computing device 202 applies a saliency estimation technique to compute a saliency map of the image 102 as described with reference to FIGS. 4 and 5.

At 604, a salient image region of the image is determined from the saliency map and, at 606, the image region that corresponds to the salient image region is removed from the image. For example, the salient regions module 216 determines a salient image region 402 of the image 102 from the saliency map as described with reference to FIG. 4, and removes the image region of the image that corresponds to the salient image region. In the example 400, the salient regions module 216 determines that the image region 404 of the foreground rocks in the image 102 is the most salient image region 406, and removes the image region 404 from the image. The salient image region of the image can be determined based on an image segmentation technique that segments the image into segmented regions, and/or based on contrast thresholds of the image regions.

At 608, the saliency map of the image is recomputed with the image region removed. For example, the salient regions module 216 applies the saliency estimation technique to recompute the saliency map of the image 102 with the image region 404 removed. The salient regions module 216 then iteratively determines subsequent salient image regions of the image until no salient image regions are detected. Multiple image objects displayed in a complex image scene of the image can be determined with the iterations, and each of the determined salient image regions represent one of the image objects in the image.

At 610, a determination is made as to whether the image includes a subsequent salient image region. For example, the salient regions module 216 determines whether the image 102 includes a subsequent salient image region 402 after the image region 404 was removed from the image (at 606) and the saliency map of the image is recomputed (at 608). If the image does include a subsequent salient image region (i.e., "yes" from 610), then the image region that corresponds to the subsequent salient image region is removed from the image at 612, and the method continues at 608 to recompute the saliency map of the image. For example, the salient regions module 216 iteratively determines subsequent salient image regions 402 of the image 102 utilizing the saliency estimation technique to recompute the saliency map of the image with the previous salient image region removed. For each iteration, the image region of the image 102 that corresponds to a subsequent salient image region is removed from the image, and the salient image regions 402 of the image are iteratively determined until no additional salient image regions are detected in the image.

If the image does include a subsequent salient image region (i.e., "no" from 610), then at 614, a salient features map is generated that includes each of the salient image regions determined iteratively and combined to generate the final saliency map. For example, the salient regions module 216 generates the salient features map 502 (FIG. 5) that includes each of the determined salient image regions 402 of the image 102, and the salient image regions are combined to generate the final saliency map. At 616, the image is cropped based on a composition of the salient image regions in the salient features map. For example, the image 102 is cropped as shown at 504 based on a composition of the salient image regions in the salient features map 502.

Figure 7:
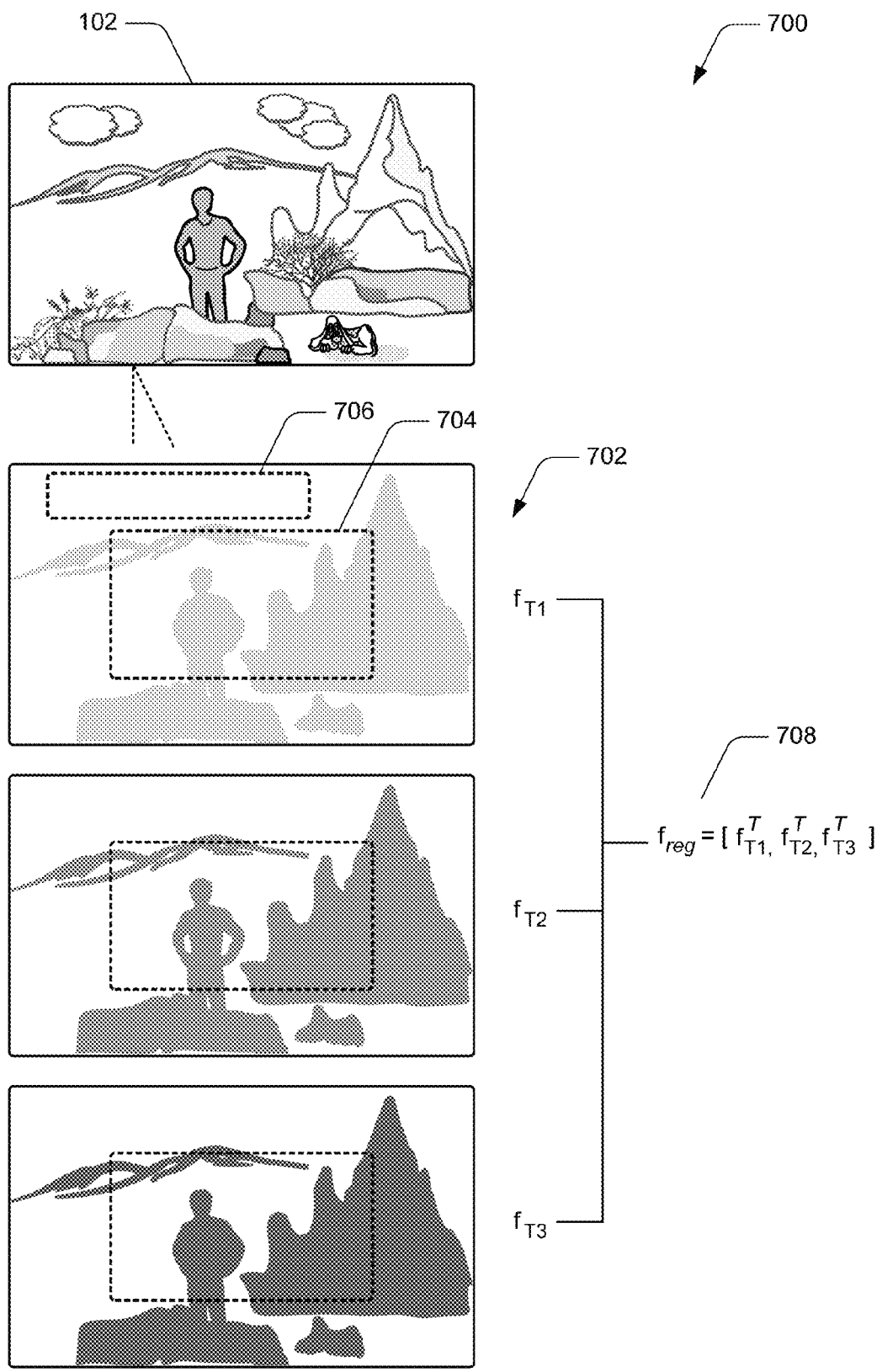
FIG. 7 illustrates an example of image foreground detection in a single image in accordance with embodiments.

FIG. 7 illustrates an example 700 of image foreground detection in the image 102. A multi-foreground detection technique is used for multi-level saliency map segmentation, and for adaptively determining saliency thresholds to detect foreground objects from a saliency map 702 with specified constraints. In this example 700, the saliency map 702 is represented with varying saliency thresholds, $T_1$, $T_2$, and $T_3$ for multi-level foreground detection. Multiple foreground regions 704 can be detected at multiple coarse-to-fine levels, and multiple isolated foreground regions can be detected at each level. A foreground can be an image region that is determined based on the threshold levels of saliency values for the segmentation region and/or based on saliency contrast within a context of the entire image. In implementations, foreground detection is achieved utilizing adaptive thresholding and segmentation alignment. In embodiments, the foreground detection module 218 of the composition application 208 shown in FIG. 2 implements image foreground detection (also referred to as multiple segmentation).

Multiple segmentation is based on a threshold technique and image segmented regions $\{r_i\}_{i=1}^{i=N_R}$ with parameters K=100, Sigma=0.5, and N=200. The foreground detection module is implemented to generate varying levels of saliency thresholds from a saliency map 702 of the image that includes foreground regions 704. The saliency thresholds can be generated based on an adaptive thresholding technique applied to the saliency map 702 of the image 102 and/or based on multi-level segmentation of the saliency map.

To generate the saliency thresholds $\{Th_j\}_{j=1}^{N_T}$, and avoid generating too small or too large of the foreground regions, a minimum foreground area $a_{min}$ and a maximum foreground area $a_{max}$ can be pre-defined. The image is searched over the saliency thresholds within a given scale $[Th_s, Th_l]$ to find a minimum threshold $Th_1$, from which foreground segmentation with an area smaller than $a_{max}$ can be generated, and to find a maximum threshold $Th_{N_T}$, from which foreground segmentation with an area larger than $a_{min}$ can be generated. The rest of the saliency thresholds can then be linearly interpolated within $[Th_1, Th_{N_T}]$. In an implementation, the $a_{min}$ is set at 0.01 of the original image area and $a_{max}$ is set at 0.7 of the original image area.

The foreground detection module 218 applies one or more constraints that distinguish the foreground regions 704 in the image, and detects the foreground regions of the image based on the saliency thresholds and the constraints. The foreground detection module 218 can also detect and extract negative regions 706 from the saliency map 702 for comparison. The feature extraction is determined at 708 by $f_{reg} = [f_{T1}^T, f_{T2}^T, f_{T3}^T]$ given the varying saliency thresholds and considering the constraints as regional features, which can include any one or combination of color distance, texture distance, isolation feature, region complexity and sharpness, a boundary connection, a visual balance of image objects at each level, image saliency, the statistics of region properties, the number of covered background layers, and any other regional features that distinguish the foreground regions of the image. Additionally, different ones of the constraints can be applied to detect different ones of the foreground regions, as well as to detect multi-level foreground regions based on the saliency thresholds and the constraints.

With the saliency thresholds for foreground region detection generated, an image segment region $r_i$ is set as a region of a foreground if the mean saliency value of this segment Avg $(S(r_i))$ is larger than the threshold $Th_j$. After segmentation, and for each level of foreground, each connected foreground component is regarded as a foreground region. Thus, $N_T$ foreground segments are generated, and each foreground contains $N_o$ foreground regions, which can be utilized for feature extractions. This segmentation technique is not only useful for computing features of image composition and is more suitable for modeling image composition, but can also be used to determine object segmentation candidates.

Figure 8:
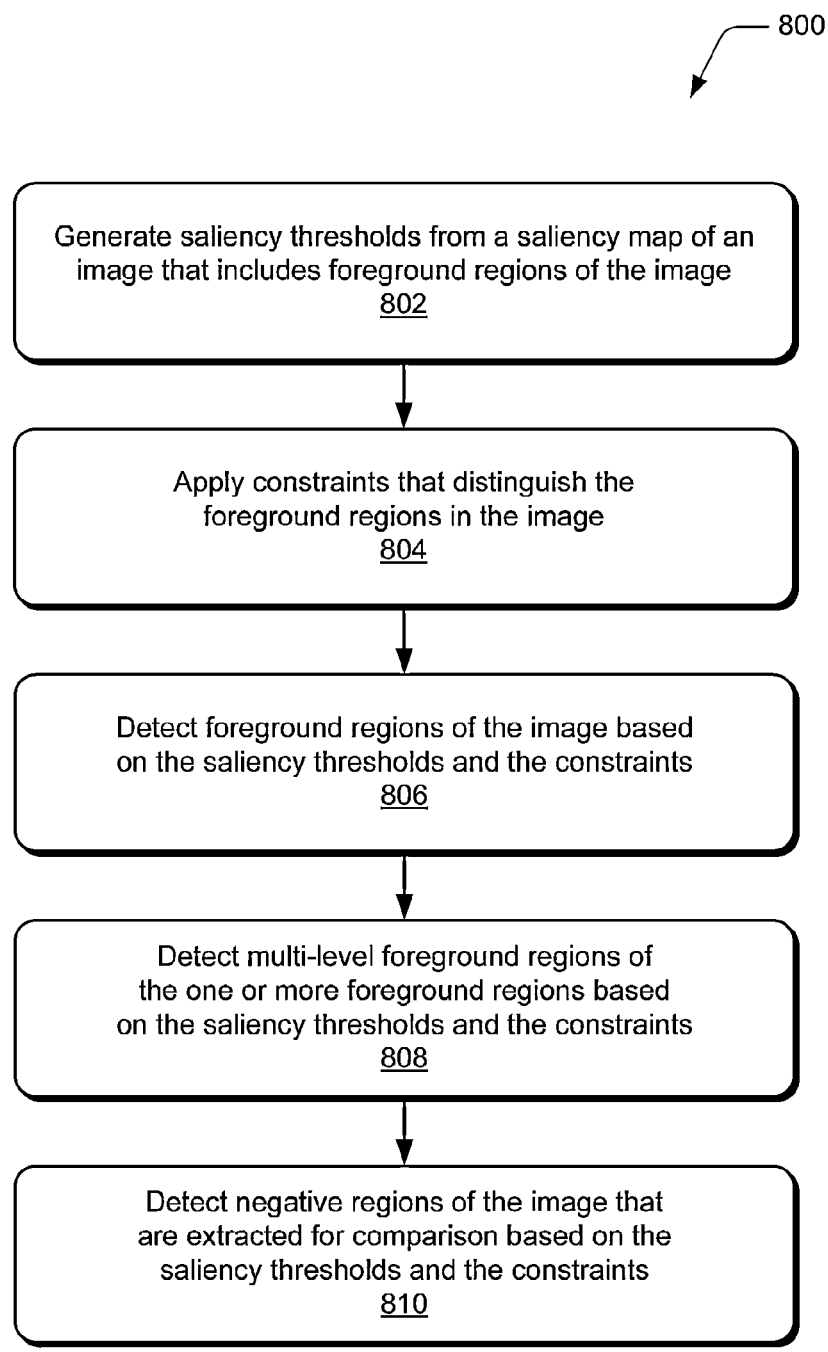
FIG. 8 illustrates example method(s) of image foreground detection in accordance with one or more embodiments.

FIG. 8 illustrates example method(s) 800 of image foreground detection, and is generally described with reference to a foreground detection module of a composition application implemented by a computing device. The order in which the method is described is not intended to be construed as a limitation, and any number or combination of the method operations can be combined in any order to implement a method, or an alternate method.

At 802, saliency thresholds are generated from a saliency map of an image that includes foreground regions of the image. For example, the foreground detection module 218 of the composition application 208 (FIG. 2) implemented by the computing device 202 generates the saliency thresholds $T_1$, $T_2$, and $T_3$ for multi-level foreground detection as described with reference to FIG. 7. In implementations, varying levels of the saliency thresholds can be generated from the saliency map 702 of the image 102, and can be based on saliency map segmentation and/or based on an adaptive thresholding technique applied to the saliency map of the image.

At 804, constraints that distinguish the foreground regions in the image are applied. For example, the foreground detection module 218 applies the constraints that distinguish the foreground regions in the image, and may include applying different ones of the constraints to detect different ones of the foreground regions. The constraints that may be applied as regional features by the foreground detection module 218 can include any one or combination of color distance, texture distance, isolation feature, region complexity and sharpness, a boundary connection, a visual balance of image objects at each level, image saliency, the statistics of region properties, the number of covered background layers, and any other regional features that distinguish the foreground regions of the image.

At 806, foreground regions of the image are detected based on the saliency thresholds and the constraints, and additionally at 808, multi-level foreground regions of the one or more foreground regions are detected based on the saliency thresholds and the one or more constraints. For example, the foreground detection module 218 detects the foreground regions 704 of the image 102 from the saliency map 702, as well as the multi-level foreground regions of the one or more foreground regions, based on the saliency thresholds and the constraints.

At 810, negative regions of the image are detected and extracted for comparison based on the saliency thresholds and the constraints. For example, the foreground detection module 218 detects negative regions 706 from the saliency map 702 that are extracted for comparison based on the saliency thresholds and the constraints.

Figure 9:
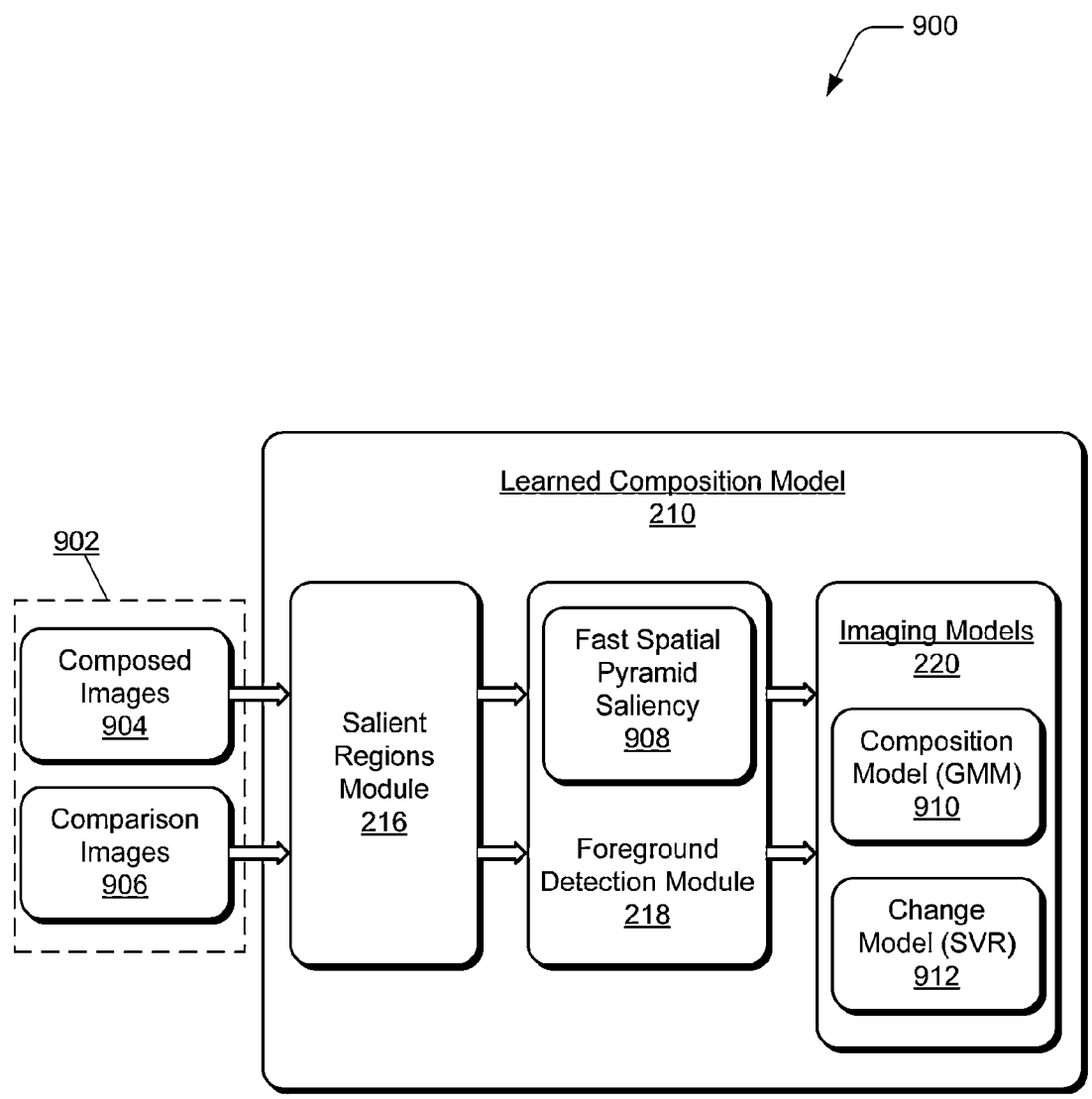
FIG. 9 illustrates an example of developing a learned composition model that can be utilized in accordance with embodiments of combined composition and change-based models for image cropping.

FIG. 9 illustrates an example 900 of developing the learned composition model 210 of the composition application 208 referenced in FIG. 2. The learned composition model 210 can be utilized in accordance with embodiments of combined composition and change-based models for image cropping. The learned composition model 210 includes the salient regions module 216 that iteratively determines salient image regions of an image as described with reference to FIGS. 4-6; the foreground detection module 218 that determines foreground regions of an image as described with reference to FIGS. 7 and 8; and the one or more imaging models 220 that reduce a number of the composition regions of an image to facilitate determining the cropped images from the image. To develop the learned composition model 210, an image set 902 is applied to learn and generate a robust cropping model. In this implementation, the image set 902 includes a large set of well-composed images 904 and a smaller set of comparison images 906, which are pairs of images both before cropping and after the images have been cropped.

Given an image I and wanting to generate an image cropping B={l, t, r, b} that crops the image into a new image $I_b$ which minimizes the given items:

$$B^* = \min_B \lambda_1 E_{Prior}(B) + \lambda_2 E_{Compose}(B) + \lambda_3 E_{Exclus}(B),$$

with $\mathbb{1}$ ($P_i$(B)), i=1, . . . , $k_1$, where $k_1$ is the number of type priories, $\mathbb{1}$ is an indicator function, and $P_i$ is the $i_{th}$ prior condition function for the prior. $E_{Prior}$ is the energy brought by some priories cues, $E_{Compose}$ is the energy measuring the composition of the cropped image, and $E_{Exclus}$ is the exclusive regional energy, which measures how much of a region in the image I should be excluded by the crop.

To calculate the energies, the learned composition model 210 uses data-driven methods. The larger set of well-composed images 904 is identified as S1 and the smaller set of comparison images 906 is identified as S2. Initially, for each image in the dataset, the salient regions module 216 iteratively determines the image saliency maps combining local and global contrast with an iterative computation strategy. Based on the saliency maps, the foreground detection module 218 generates the multiple saliency segmentation, which results in multi-level foreground regions, and multiple foreground regions in each foreground.

After pre-processing with the salient regions module 216 and the foreground detection module 218 to find the priories, statistics of properties of the well-composed images 904 are used to obtain the prior condition functions and respective prior parameters. To learn the compositional energy, a fast spacial pyramid saliency (SPS) module 908 computes an SPS feature from the saliency map, and a compositional model 910 (i.e., a Gaussian mixture model (GMM)) is learned from the image set 902 of the well-composed images 904 and the cropped images in the set of comparison images 906. To compute the exclusive energy based on saliency maps for image segmentation and multi-level segmentation, regional exclusive features are computed to develop a support vector regression (SVR) change model 912 using the regions included by crops of the images and excluded by crops of the images. Additionally, to measure the composition energy in detail, the SVR change model is also developed by extracting compositional features from the comparison images 906 both before and after a person has cropped the images (i.e., I and $I_B$). Therefore, the composition energy is computed from two models, including the GMM composition model 910, which can be computed very fast, and including the detailed SVR change model 912 that measures both the composition and the change between I and $I_B$ (i.e., the comparison images 906 both before and after cropping). Formally:

$$E_{Compose}(B) = \gamma_1 E_{GMMCompose}(B) + \gamma_2 E_{SVRCompose}(B)$$

Figure 10:
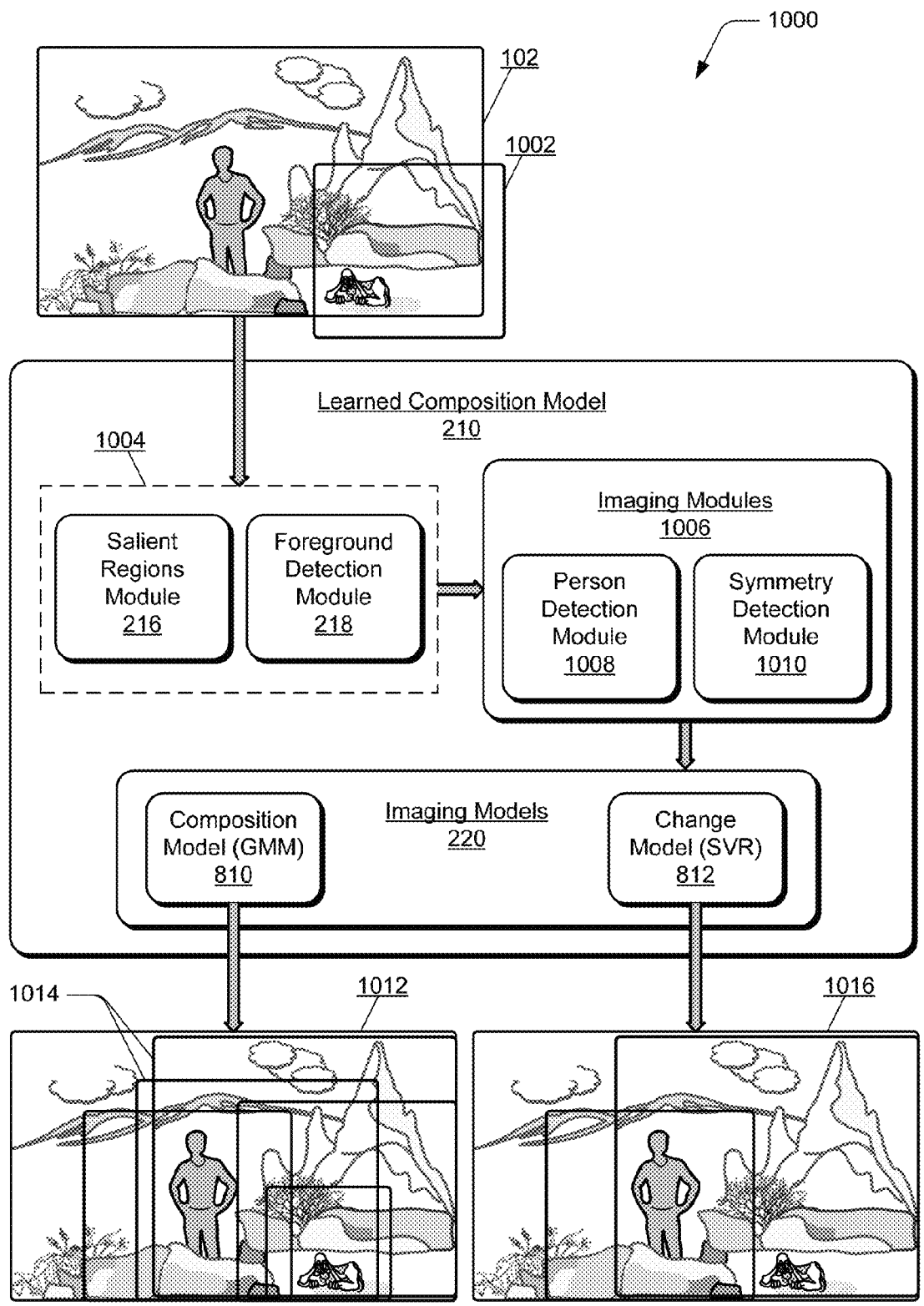
FIG. 10 illustrates an example of applying the learned composition model in accordance with embodiments of combined composition and change-based models for image cropping.

FIG. 10 illustrates an example 1000 of applying the learned composition model 210 of the composition application 208. The composition application 208 is implemented to apply one or more of the image composition modules and models of the learned composition model 210 to evaluate multiple composition regions of the image 102. The learned composition model can determine the cropped images 104 from the image 102 based on the applied image composition modules and models, as shown in FIG. 1. The composition application can also update the learned composition model with the cropped images that are determined from the image, such as to learn the cropping style of a particular user.

Given an image I (e.g., the image 102), the learned composition model 210 enumerates over the image (i.e., a solution space), such as by using a sliding window (represented at 1002) to generate candidate cropping regions of the image, which may generate tens of thousands of potential cropping regions for the image. The salient regions module 216 and the foreground detection module 218 of the learned composition model 210 are applied at 1004 as a pre-pruning function to eliminate all of the image cropping regions that do not satisfy the constraints. The learned composition model 210 may also include other imaging modules 1006, such as a person detection module 1008 and a symmetry detection module 1010. The person detection module 1008 is applied to maintain a whole person in a composition region of the image, so as not to cut across a person in an image with a cropping boundary. The symmetry detection module 1010 is applied to take into account symmetrical features in the composition regions of the image, such as by allotting a higher consideration weight based on image symmetry.

For the remaining image cropping regions at 1012, the composition model 910 is applied as the Gaussian mixture model (GMM) procedure of the learned composition model 210 to reduce the number of the candidate composition regions 1014 of the image 102, and the change model 912 is applied at 1016 as a regression function of the learned composition model to further reduce the number of the candidate composition regions of the image. The priories energy is computed using the learned composition model 210 to obtain the $E_{Prior}(B)$, and compute the SPS feature to determine the GMM composition energy $E_{GMMCompose}(B)$ and the exclusive feature to determine $E_{Exclus}(B)$. To accelerate the computation, a strategy similar to a cascade technique is used to first disregard the potential image crops that rank out of the first $N_1$ crops by decent sorting the current computed energy. Next computed is the relative complex in detailed composition energy $E_{SVRCompose}(B)$ to verify all of the image crops and re-rank the remaining $N_1$ image crops. The first ranked $N_2$ image crops are retained, and a non-maximum suppression is performed to generate proposed final candidates of the image crops to provide a user the cropping choices for the image. In implementations, set $N_1$ is set equal to 1000 and $N_2$ is set equal to 50 to determine the candidate image crops.

The techniques described above to apply the learned composition model 210 for image cropping implement several contributing models and modules. The salient regions module 216 implements a robust saliency region estimation for composition that combines local and global saliency cues, as well as an iterative approach for robust detection of multiple attention regions. The foreground detection module 218 is implemented for multi-level segmentation, and to detect multiple foreground regions for robust feature extraction. Additionally, and not limited to composition, the multi-level foreground feature can also be extended to extract robust features for a selection of the best foreground segmentation. The learned composition model 210 is developed by considering both the well-composed images 904 and the pairs of comparison images 906 before and after the images are cropped. Additionally, other image composition features are implemented, such as for spatial pyramid saliency (SPS), the person detection module 1008 for person detection, and the symmetry detection module 1010 for symmetric feature detection to improve the image cropping results. A processing speed of the algorithm is increased by implementing the contributing models and modules in a cascade manner of selection procedures.

As described, the learned composition model 210 is a data-driven technique based on three types of energy, namely prior energy, compositional energy, and exclusive energy. The prior constraints consist of the four aspects $k_1=4$ in the equation below, an aspect ratio, a cropping area, human avoiding, and certain foreground inclusion:

$$B^* = \min_B \lambda_1 E_{Prior}(B) + \lambda_2 E_{Compose}(B) + \lambda_3 E_{Exclus}(B),$$

with $(P_i(B))\mathbb{1}$, $i=1, \ldots, k_1$, and a crop B is omitted if one of these conditions are failed. Formally the conditions can be written as:

$C_{Ratio}=\mathbb{1}$ $(Ra(B) \in Range_{Ra})$;

$C_{Area}=\mathbb{1}$ $(Area(B) > Th_{area})$;

$C_{fg}=\mathbb{1}$ $(FgVal(B) > Th_{Fg})$;

$C_{human}=\mathbb{1}$ $(\exists H, s.t.\ Overlap(B,H)/Area(H) \in Range_{human})$;

where Ra(B) is the ratio of the height and width of the cropping box, RangeRa=x; $x>10|x<1/10|x\in[0.9, 1.1]$, which indicates not having a cropping region (e.g., boundary box) that has a too thin ratio or a square ratio. The $Th_{area}$ is set at 0.15 of the image area, the FgVal(B) indicates the average ratio of included foreground region and the total foreground region from all of the segmentation. The $Th_{fg}$ is equal to 0.55. The Overlap(B, H) indicates the overlap area of B and a detected human rectangle H, and $Range_{human}=1, 0$.

Prior energy: The priories contained in $E_{Prior}(B)$ are composed of three aspects, namely aspect ratio, foreground region, and image symmetry. With reference to the aspect ratio, and as noted from the comparison images 906, a person is likely to crop an image close in appearance to the original cropped image. Therefore, the ratio of the prior energy is set to $Eratio(B)=d_e(ra(B)-Ra(I))/\delta_r^2$ where $d_e$ is the Euclidean distance and $\delta_r$ is set equal to 0.5.

With reference to the foreground regions, it is noted that good image crops should not crop out or cut off too much of the foreground of an image, and the foreground energy is stated as:

$$E_{Fg}(B) = \begin{cases} -\log(FgVal(B)) & \text{if } FgVal(B) < 0.8 \\ 0 & \text{otherwise} \end{cases}$$

where FgVal(B) is defined above in the conditions equation for $C_{fg}$.

With reference to image symmetry, such as for an image with a high symmetric property, and as noted from the comparison images 906 that are cropped by a person, the cropped images generally maintain the symmetric property of an image. Due to the smaller number of the training images (i.e., the comparison images 906), this feature can be hard-coded as a strong prior. The algorithm proposes several symmetric axis candidates, and for each axis, the image can be separated into a left image and right image of the same size to then detect the scale-invariant feature transform (SIFT) descriptors on each image and match the two sets of SIFT descriptors. The match points p1 and p2 that are located in a similar position in a respective image are determined (i.e., $\|P_{p1}-P_{p2}\| \leq Th_d$), and the number of matches are recorded as the ratio of such matches to all of the matches and the mean distance of these matches. Then, if there exists an axis a with the number of matches larger than 20 and the portion of matches is larger than 0.3, the image is recognized as a symmetric image and the axis a with the minimum match spatial distance is determined. The symmetric energy is then:

$$E_{Symmetric}(B) = \begin{cases} 0 & \text{if } Sym(B, a) \text{ and } Sym(I, a) \\ 1 & \text{otherwise} \end{cases}$$

where Sym(I, a) is an indicator function that indicates the image I is symmetric with respect to the axis a.

$E_{Prior}(B)=E_{ratio}(B)+E_{Fg}(B)+\eta E_{Symmetric}(B)$ where $\eta$ is set equal to 10 to give a height weight to symmetric crops if the image is symmetric. Note that if the image is symmetric, the results are returned directly with $E_{Prior}(B)$.

Compositional energy: As described above, the first compositional model is the GMM model developed based on the well-composed image set S1 (i.e., the composed images 904) with a fast spatial pyramid saliency (SPS) feature. The SPS is computed by separating the saliency map into multiple levels of regular grids and concatenating the feature into a final feature vector of $f_{sps}=[f_{p_1}^T \ldots f_{p_m}^T]^T$ and in an implementation, the pyramid of the feature is $\{12 \times 12, 24 \times 24, 48 \times 48\}$. In developing the learned composition model 210, a PCA model PM is learned that drops the feature into a twenty (20) dimension, which generally maintains 90% of the PCA energy and the feature is input into a GMM training procedure with ten (10) Gaussian components to learn the mixture composed model CM. With this model, the first term $E_{GMM\ Compose}(B)=-\log(P(f_{sps,B}|CM, PM))$. In implementations, a probability computation may also be utilized.

The second compositional model is the SVR model developed based on the person-cropped image set S2 (i.e., the comparison images 906) with an in-detail computed composition feature. The in-detail computed features can be: a distance of the saliency map centroid and detected foreground region center from the nearest rule-of-thirds point; distribution statistics of saliency map values, to include average standard deviation, skewness, and kurtosis; segmented region area statistics, to include average, standard deviation, skewness, and kurtosis; a perspective ratio; and prominent line features, to include the average position and angle. However, the feature with the foreground center distance to the rule-of-thirds points are modified to be a feature concatenating the ones in each foreground. Additionally, for a crop B, several composition features are proposed, such as: (1) multiple foreground regions may be detected, where the visual balance feature (i.e., the distance between the foreground region centroid to an image center) is computed if there are more than one foreground regions; (2) the average center position and average orientation of diagonal lines detected in the image; and (3) the covered number of background layers of the image.

Specifically, the image segments determined above by multiple foreground segmentation (e.g., by the foreground detection module 218) are merged into a smaller set of segments $\{r2_i\}_{i=1}N_{R2}$ based on the segments $\{r_i\}_{i=1}N_R$ where $N_{R2}$ is set equal to 5 and the merge method is based on greedily merging the regions for the $\chi^2$ distance between regional color histograms in CLAB color space. A region $r2_i$ is then set to be a layer of background if it satisfies the following conditions:

$c_a = \mathbb{1}\ (\text{Area}(r2_i) > T_a)$;

$c_s = \mathbb{1}\ (\text{Sal}(r2_i) < T_s)$;

$c_a = \mathbb{1}\ (\text{BoundaryLen}(r2_i)/\text{Len}(r2_i) > T_b)$;

where $\text{Area}(r2_i)$ is the area of the region, $\text{Sal}(r2_i)$ is the average saliency within the region, and $\text{BoundaryLen}(r2_i)$ is the length of region contour that is connected with the image border. The thresholds are $T_a=0.15$, $T_s=0.1$, and $T_b=0.2$. From these features, the SVR model is developed and the second term $E_{SVRCompose}(B)=(1-\text{Composition}(B))$.

Exclusive energy: The exclusive energy is also based on a SVR model trained from regional features, developed with multiple foreground regions. For each level of foreground, K1 connected components are detected as foreground regions. Further, K2 background regions are detected through the criteria in the equation:

$c_a = \mathbb{1}\ (\text{Area}(r2_i) > T_a)$;

$c_s = \mathbb{1}\ (\text{Sal}(r2_i) < T_s)$;

$c_a = \mathbb{1}\ (\text{BoundaryLen}(r2_i)/\text{Len}(r2_i) > T_b)$;

with the original segments $\{r_i\}_{i=1}N_R$, but with a different set of thresholds ($T_a=0.05$, $T_s=0.1$, and $T_b=0.2$). The color distance, texture distance, and isolation feature of the computed regional features take into account the foreground regions and background regions, and the regional distance is set to be the minimum distance to all of the foreground regions. The regional feature of each foreground region is assigned to the corresponding regions that it covers, which makes the size of regions consistent in different foreground segmentations. The features that are computed from all levels of foreground segmentation are then concatenated, resulting in a more robust features determination. Additionally, the regional feature BoundaryLen($r2_i$)/Len($r2_i$) is used to enhance the training of the model. Additionally, the cropped image set (i.e., the comparison images 906) is used to train a crop out regression model that measures whether a region should be cropped out, and a cut through model that measures whether a region should be cut by a crop. The exclusive energy function is defined as $E_{Exclus}(B)=E_{cropout}+\mu E_{cutthrough}$, where $\mu$ is set equal to one (1).

Figure 11:
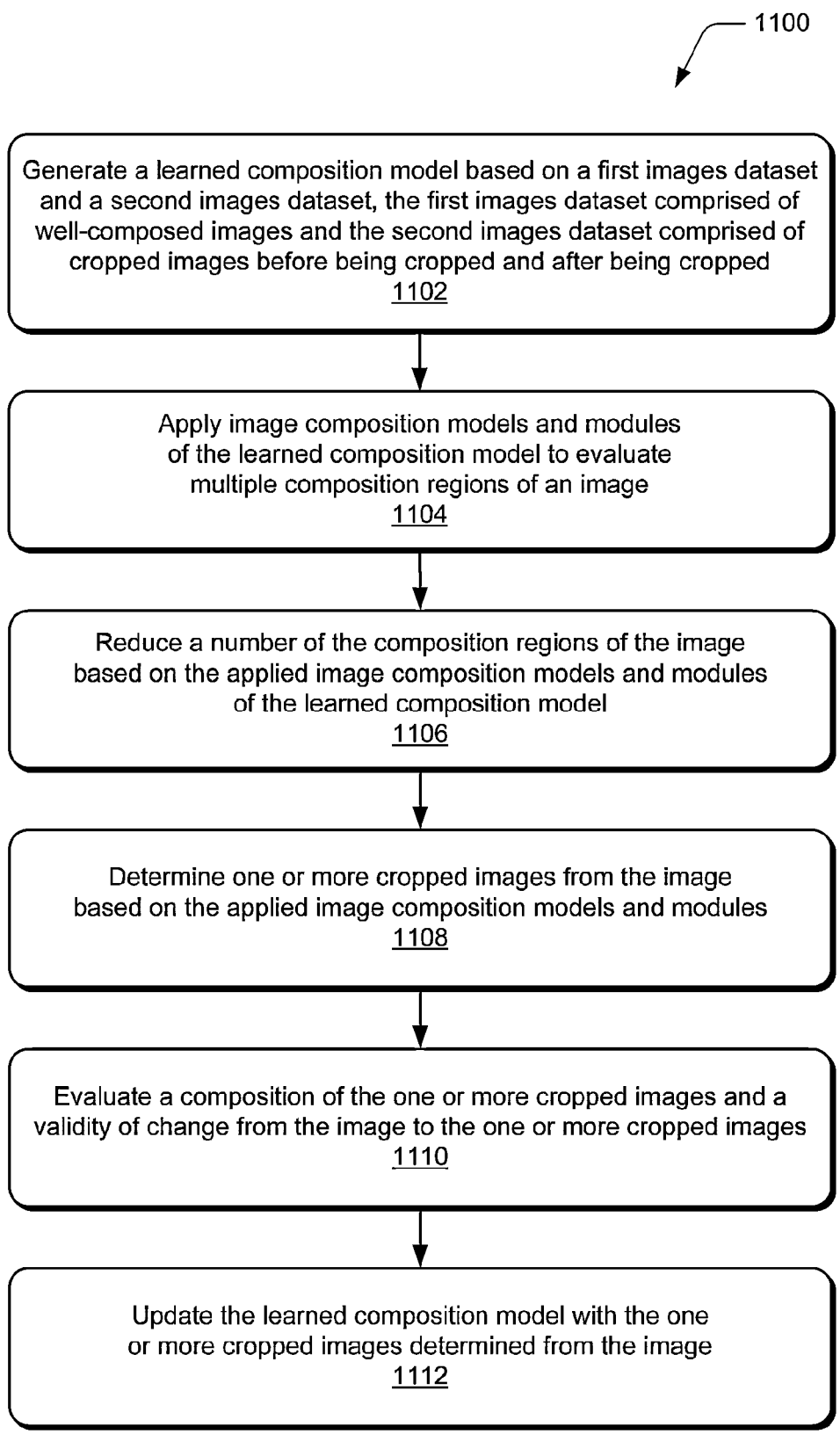
FIG. 11 illustrates example method(s) of a learned composition model for image cropping in accordance with one or more embodiments.

FIG. 11 illustrates example method(s) 1100 of combined composition and change-based models for image cropping, and is generally described with reference to a learned composition model of a composition application implemented by a computing device. The order in which the method is described is not intended to be construed as a limitation, and any number or combination of the method operations can be combined in any order to implement a method, or an alternate method.

At 1102, a learned composition model is generated based on a first images dataset and a second images dataset, where the first images dataset is comprised of well-composed images and the second images dataset is comprised of cropped images before being cropped and after being cropped. For example, the learned composition model 210 is developed as described with reference to FIGS. 9 and 10, based on the large set of well-composed images 904 and the smaller set of comparison images 906, which are pairs of images both before cropping and after the images have been cropped.

At 1104, image composition models and modules of the learned composition model are applied to evaluate multiple composition regions of an image. For example, the learned composition model 210 includes the salient regions module 216 that iteratively determines salient image regions of the image 102, and includes the foreground detection module 218 that determines the foreground regions of the image. The learned composition model 210 also includes the imaging models 220 that reduce a number of the composition regions of the image to facilitate determining the cropped images 104 from the image 102. In implementations, the learned composition model 210 may also include the person detection module 1008 that is applied to maintain a whole person in a composition region of the image, and may include the symmetry detection module 1010 that is applied to take into account symmetrical features in the composition regions of the image.

At 1106, a number of the composition regions of the image are reduced based on the applied image composition models and modules of the learned composition model. For example, the learned composition model 210 includes the composition model 910 and the change model 912, where the composition model is applied as a Gaussian mixture model (GMM) procedure of the learned composition model to reduce the number of the composition regions 1014 of the image 102. The change model is applied as a regression function of the learned composition model to further reduce the number of the composition regions of the image.

At 1108, one or more cropped images are determined from the image based on the applied image composition modules. For example, the composition application 208 determines one or more of the cropped images 104 from the image 102 based on the imaging models and modules of the learned composition model 210. At 1110, a composition of the one or more cropped images and a validity of change from the image to the one or more cropped images is evaluated. For example, the salient regions module 216 and the foreground detection module 218 implement the Gaussian mixture model (GMM) and a regression function to evaluate the composition of the cropped images and the validity of the change from the image to the cropped images, respectively. At 1112, the learned composition model is updated with the one or more cropped images determined from the image. For example, the learned composition model 210 can be updated with cropped images of the image 102 that are selected by a user, such as to learn and adapt to the cropping style of the particular user.

Figure 12:
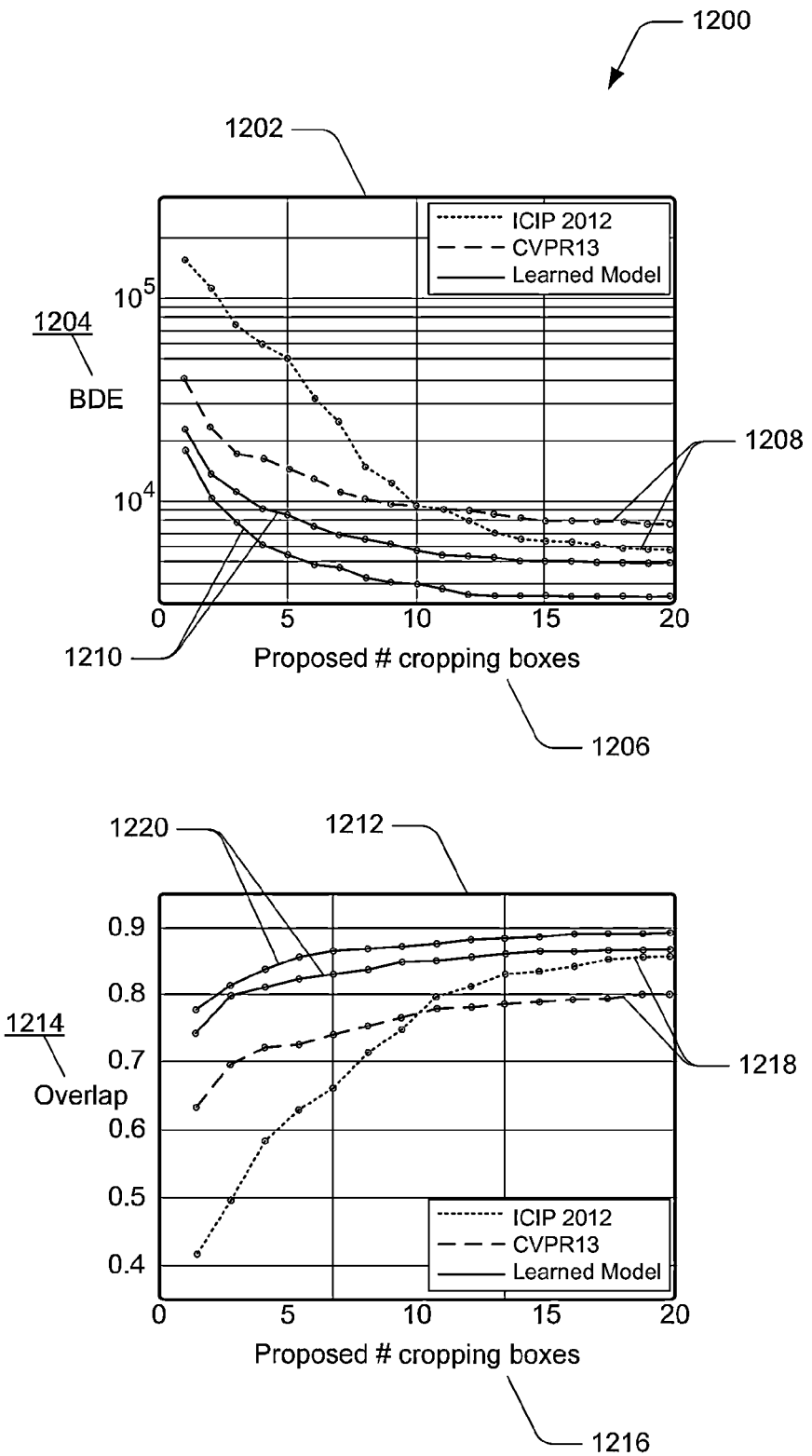
FIG. 12 illustrates examples of image cropping results when implementing the combined composition and change-based models for image cropping in accordance with one or more embodiments.

FIG. 12 illustrates examples 1200 of image cropping results when implementing the learned compensation model 210 for image cropping, such as when cropping the image 102 to generate the cropped images 104, as shown in FIG. 4. A first results chart 1202 illustrates a comparison of boundary displacement error (BDE) 1204 on the y-axis in relation to a proposed number of image cropping boxes 1206 for an image on the x-axis. The results 1208 of conventional techniques are shown as the dashed lines, and two examples of results 1210 of the learned composition model 210 are shown as the solid lines in the results chart. The boundary displacement error represents the average distance from an image crop boundary to a professional crop boundary of the image. As can be seen in the results chart, the boundary displacement error of the learned composition model 210 is less than that of the conventional techniques.

A second results chart 1212 illustrates a comparison of overlap 1214 on the y-axis in relation to a proposed number of image cropping boxes 1216 for an image on the x-axis. The results 1218 of the conventional techniques are shown as the dashed lines, and two examples of results 1220 of the learned composition model 210 are shown as the solid lines in the results chart. The overlap represents, such as on a scale of 0.0 to 1.0, the overlap of an image crop to a professional crop of the image. As can be seen in the results chart, even the first two proposed image crops of the image determined by the learned composition model 210 are approximately 0.8 overlapping a professional crop of the image, whereas the conventional techniques fall well below in performance.

Figure 13:
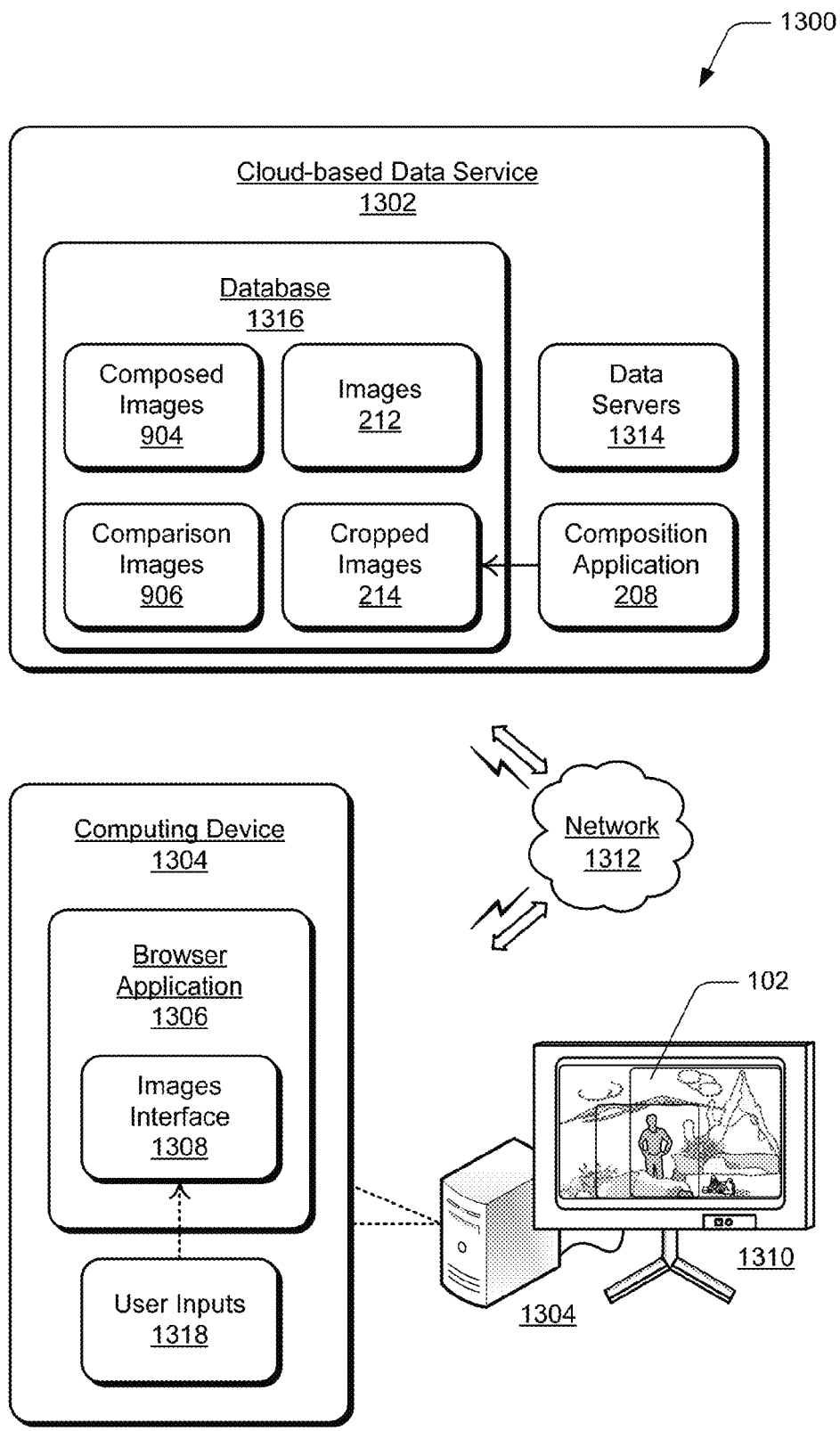
FIG. 13 illustrates an example system in which embodiments of image foreground detection can be implemented.

FIG. 13 illustrates an example system 1300 in which embodiments of image foreground detection can be implemented. The example system 1300 includes a cloud-based data service 1302 that a user can access via a computing device 1304, such as any type of computer, mobile phone, tablet device, and/or other type of computing device. The computing device 1304 can be implemented with a browser application 1306 through which a user can access the data service 1302 and initiate a display of an images interface 1308 to display images, such as image 102 also shown on a display device 1310 that is connected to the computing device. The computing device 1304 can be implemented with various components, such as a processing system and memory, and with any number and combination of differing components as further described with reference to the example device shown in FIG. 14.

In embodiments of image foreground detection, the cloud-based data service 1302 is an example of a network service that provides an on-line, Web-based version of the composition application 208 that a user can log into from the computing device 1304 and display the images interface 1308. The network service may be utilized for any type of image editing and processing, to include illustration editing, video compositing and editing, graphics and page layouts, animation, and any other type of application user interface. The data service can also maintain and/or upload the images 212 that are displayable in the images interface 1308.

Any of the devices, data servers, and networked services described herein can communicate via a network 1312, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

The cloud-based data service 1302 includes data servers 1314 that may be implemented as any suitable memory, memory device, or electronic data storage for network-based data storage, and the data servers communicate data to computing devices via the network 1312. The data servers 1314 maintain a database 1316 of the user images 212, as well as the cropped images 214 that are generated by the composition application 208. The database 1316 can also include the well-composed images 904 and the comparison images 906 that are utilized to develop the learned composition model 210 of the composition application 208.

The cloud-based data service 1302 includes the composition application 208, such as a software application (e.g., executable instructions) that is executable with a processing system to implement embodiments of image foreground detection. The composition application 208 can be stored on a computer-readable storage memory, such as any suitable memory, storage device, or electronic data storage implemented by the data servers 1314. Further, the data service 1302 can include any server devices and applications, and can be implemented with various components, such as a processing system and memory, as well as with any number and combination of differing components as further described with reference to the example device shown in FIG. 14.

The data service 1302 communicates the images data and images interface 1308 of the composition application 208 to the computing device 1304 where the images interface is displayed, such as through the browser application 1306 and displayed on the display device 1310 of the computing device. The composition application 208 also receives user inputs 1318 to the images interface 1308, such as when a user at the computing device 1304 initiates a user input with a computer input device or as a touch input on a touchscreen to crop an image or to select one of multiple image croppings. The computing device 1304 communicates the user inputs 1318 to the data service 1302 via the network 1312, where the composition application 208 receives the user inputs.

Figure 14:
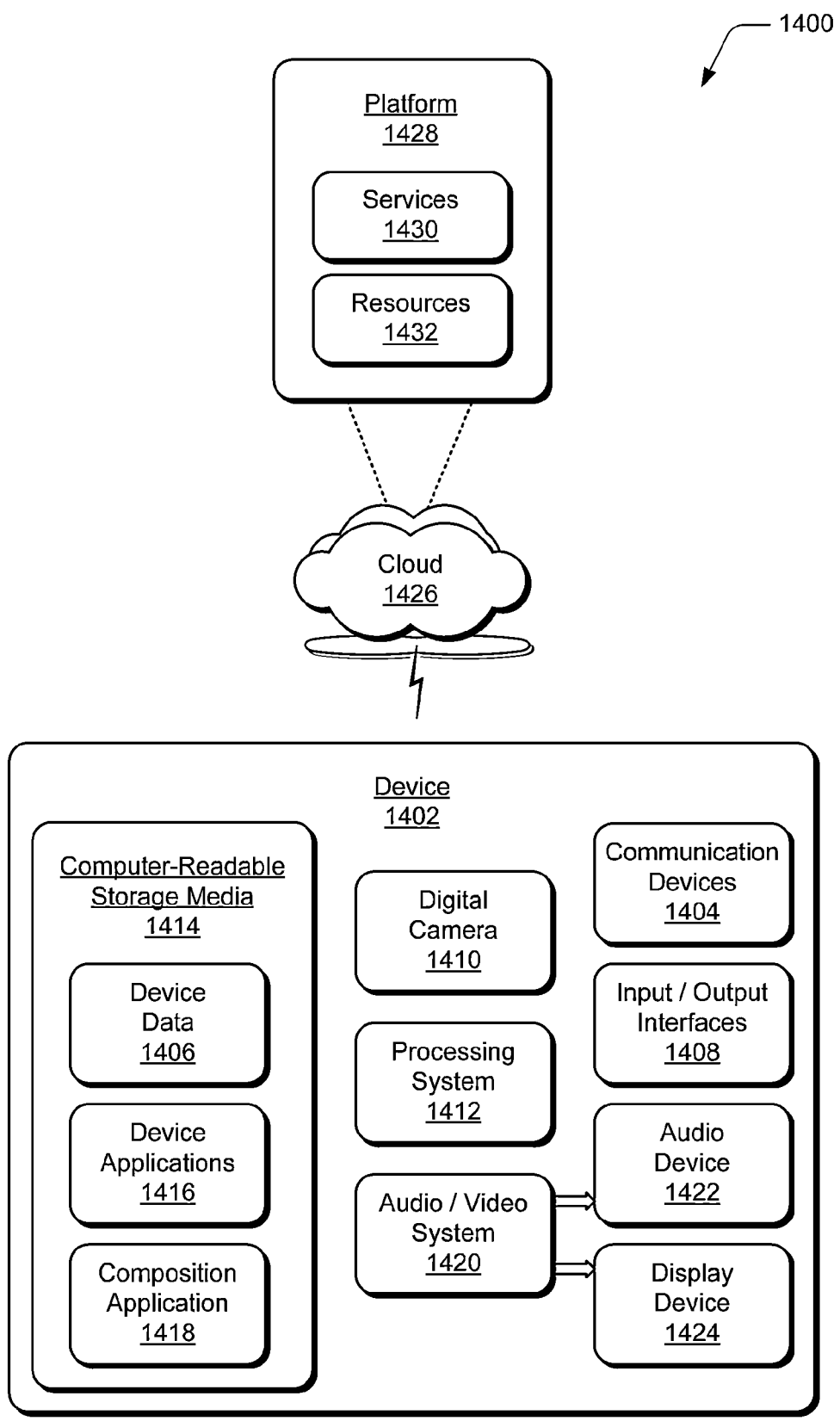
FIG. 14 illustrates an example system with an example device that can implement embodiments of image foreground detection.

FIG. 14 illustrates an example system 1400 that includes an example device 1402, which can implement embodiments of image foreground detection. The example device 1402 can be implemented as any of the devices and/or server devices described with reference to the previous FIGS. 1-13, such as any type of client device, mobile phone, tablet, computing, communication, entertainment, gaming, media playback, digital camera, and/or other type of device. For example, the device 202 shown in FIG. 2, as well as the computing device 1304 and the data service 1302, as well as any devices and data servers of the data service, shown in FIG. 13 may be implemented as the example device 1402.

The device 1402 includes communication devices 1404 that enable wired and/or wireless communication of device data 1406, such as the images 212, cropped images 214, and other associated image data. The device data can include any type of audio, video, and/or image data, as well as the images and cropped images. The communication devices 1404 can also include transceivers for cellular phone communication and/or for network data communication.

The device 1402 also includes input/output (I/O) interfaces 1408, such as data network interfaces that provide connection and/or communication links between the device, data networks, and other devices. The I/O interfaces can be used to couple the device to any type of components, peripherals, and/or accessory devices, such as a digital camera device 1410 and/or display device that may be integrated with the device 1402. The I/O interfaces also include data input ports via which any type of data, media content, and/or inputs can be received, such as user inputs to the device, as well as any type of audio, video, and/or image data received from any content and/or data source.

The device 1402 includes a processing system 1412 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1402 may further include any type of a system bus or other data and command transfer system that couples the various components within the device. A system bus can include any one or combination of different bus structures and architectures, as well as control and data lines.

The device 1402 also includes computer-readable storage media 1414, such as storage memory and data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

The computer-readable storage media 1414 provides storage of the device data 1406 and various device applications 1416, such as an operating system that is maintained as a software application with the computer-readable storage media and executed by the processing system 1412. In this example, the device applications also include a composition application 1418 that implements embodiments of image foreground detection, such as when the example device 1402 is implemented as the device 202 shown in FIG. 2 or the data service 1302 shown in FIG. 13. An example of the composition application 1418 includes the composition application 208 implemented by the device 202 and/or at the data service 1302, as described in the previous FIGS. 2-13.

The device 1402 also includes an audio and/or video system 1420 that generates audio data for an audio device 1422 and/or generates display data for a display device 1424. The audio device and/or the display device include any devices that process, display, and/or otherwise render audio, video, display, and/or image data, such as the image content of a digital photo. In implementations, the audio device and/or the display device are integrated components of the example device 1402. Alternatively, the audio device and/or the display device are external, peripheral components to the example device.

In embodiments, at least part of the techniques described for image foreground detection may be implemented in a distributed system, such as over a "cloud" 1426 in a platform 1428. The cloud 1426 includes and/or is representative of the platform 1428 for services 1430 and/or resources 1432. For example, the services 1430 may include the data service 1302 as described with reference to FIG. 13. Additionally, the resources 1432 may include the composition application 208 that is implemented at the data service as described with reference to FIG. 13.

The platform 1428 abstracts underlying functionality of hardware, such as server devices (e.g., included in the services 1430) and/or software resources (e.g., included as the resources 1432), and connects the example device 1402 with other devices, servers, etc. The resources 1432 may also include applications and/or data that can be utilized while computer processing is executed on servers that are remote from the example device 1402. Additionally, the services 1430 and/or the resources 1432 may facilitate subscriber network services, such as over the Internet, a cellular network, or Wi-Fi network. The platform 1428 may also serve to abstract and scale resources to service a demand for the resources 1432 that are implemented via the platform, such as in an interconnected device embodiment with functionality distributed throughout the system 1400. For example, the functionality may be implemented in part at the example device 1402 as well as via the platform 1428 that abstracts the functionality of the cloud 1426.

Although embodiments of image foreground detection have been described in language specific to features and/or methods, the appended claims are not necessarily limited to the specific features or methods described. Rather, the specific features and methods are disclosed as example implementations of image foreground detection.

The invention claimed is:

1. A method, comprising:
   executing a foreground detection module as software executable instructions to perform:
   generating saliency thresholds from a saliency map of an image that includes foreground regions of the image;
   applying constraints that distinguish the foreground regions in the image, different ones of the constraints applied in different combinations of the constraints;
   detecting one or more of the foreground regions of the image based on the saliency thresholds and the different combinations of the constraints; and
   determining an image composition of the image based on the detected one or more foreground regions of the image.

2. The method as recited in claim 1, wherein each of the different combinations of the constraints distinguishes a different one of the foreground regions of the image.

3. The method as recited in claim 1, further comprising:
   detecting multi-level foreground regions of the one or more foreground regions based on the saliency thresholds and the different combinations of the constraints.

4. The method as recited in claim 1, further comprising:
   generating varying levels of the saliency thresholds from the saliency map of the image.

5. The method as recited in claim 1, further comprising:
   generating the saliency thresholds based on an adaptive thresholding technique applied to the saliency map of the image.

6. The method as recited in claim 1, further comprising:
generating the saliency thresholds based on saliency map segmentation.

7. The method as recited in claim 6, wherein the saliency map segmentation is a multi-level segmentation of the saliency map to said generate the saliency thresholds.

8. A computing device, comprising:
a memory configured to maintain an image that includes foreground regions of the image;
a processor to implement a foreground detection module that is configured to:
generate saliency thresholds from a saliency map of the image;
apply constraints that distinguish the foreground regions in the image, different ones of the constraints configured to be applied in different combinations of the constraints;
detect one or more of the foreground regions of the image based on the saliency thresholds and the different combinations of the constraints; and
determine an image composition of the image based on the detected one or more foreground regions of the image.

9. The computing device as recited in claim 8, wherein each of the different combinations of the constraints distinguishes a different one of the foreground regions of the image.

10. The computing device as recited in claim 8, wherein wherein the foreground detection module is configured to detect multi-level foreground regions of the one or more foreground regions based on the saliency thresholds and the different combinations of the constraints.

11. The computing device as recited in claim 8, wherein the foreground detection module is configured to generate varying levels of the saliency thresholds from the saliency map of the image.

12. The computing device as recited in claim 8, wherein the foreground detection module is configured to generate the saliency thresholds based on an adaptive thresholding technique applied to the saliency map of the image.

13. The computing device as recited in claim 8, wherein the foreground detection module is configured to generate the saliency thresholds based on saliency map segmentation.

14. The computing device as recited in claim 13, wherein the saliency map segmentation is a multi-level segmentation of the saliency map to said generate the saliency thresholds.

15. A computer-readable storage memory device comprising a foreground detection module stored as instructions that are executable and, responsive to execution of the instructions by a computing device, the computing device performs operations of the foreground detection module comprising to:
generate saliency thresholds from a saliency map of an image that includes foreground regions of the image;
apply constraints that distinguish the foreground regions in the image, different ones of the constraints configured to be applied in different combinations of the constraints;
detect one or more of the foreground regions of the image based on the saliency thresholds and the different combinations of the constraints; and
determine an image composition of the image based on the detected one or more foreground regions of the image.

16. The computer-readable storage memory device as recited in claim 15, wherein each of the different combinations of the constraints distinguishes a different one of the foreground regions of the image.

17. The computer-readable storage memory device as recited in claim 15, wherein the computing device further performs operations of the foreground detection module comprising to detect multi-level foreground regions of the one or more foreground regions based on the saliency thresholds and the different combinations of the constraints.

18. The computer-readable storage memory device as recited in claim 15, wherein the computing device further performs operations of the foreground detection module comprising to generate varying levels of the saliency thresholds from the saliency map of the image.

19. The computer-readable storage memory device as recited in claim 15, wherein the computing device further performs operations of the foreground detection module comprising to generate the saliency thresholds based on an adaptive thresholding technique applied to the saliency map of the image.

20. The computer-readable storage memory device as recited in claim 15, wherein the computing device further performs operations of the foreground detection module comprising to generate the saliency thresholds based on saliency map segmentation.

* * * * *